United States Patent
Holenstein et al.

(10) Patent No.: US 6,985,711 B2
(45) Date of Patent: Jan. 10, 2006

(54) DIRECT CURRENT OFFSET CANCELLATION FOR MOBILE STATION MODEMS USING DIRECT CONVERSION

(75) Inventors: Christian Holenstein, San Diego, CA (US); Inyup Kang, San Diego, CA (US); Matthew Severson, Oceanside, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 407 days.

(21) Appl. No.: 10/139,205

(22) Filed: May 2, 2002

(65) Prior Publication Data

US 2003/0199264 A1    Oct. 23, 2003

Related U.S. Application Data

(60) Provisional application No. 60/371,692, filed on Apr. 9, 2002.

(51) Int. Cl.
   *H04B 1/10*    (2006.01)
(52) U.S. Cl. .................. 455/312; 455/324; 455/266
(58) Field of Classification Search ................ 455/266, 455/296, 307, 324, 339, 340, 303, 311, 312; 375/346, 350
   See application file for complete search history.

(56) References Cited

U.S. PATENT DOCUMENTS

| 5,459,679 A | 10/1995 | Ziperovich ................. 364/602 |
| 5,754,595 A | 5/1998 | Honkasalo (nee Zhu) et al. ........................ 375/286 |
| 6,009,126 A * | 12/1999 | Van Bezooijen ............ 375/319 |
| 6,114,980 A * | 9/2000 | Tilley et al. ................. 341/118 |
| 6,166,668 A * | 12/2000 | Bautista et al. ............. 341/118 |
| 6,225,848 B1 | 5/2001 | Tilley et al. ................. 327/307 |
| 6,285,958 B1 | 9/2001 | Wolf et al. .................... 702/87 |
| 6,327,313 B1 | 12/2001 | Traylor et al. ............... 375/316 |
| 6,356,217 B1 * | 3/2002 | Tilley et al. ................ 341/118 |
| 6,614,806 B1 * | 9/2003 | Nanni ......................... 370/468 |
| 2002/0160734 A1* | 10/2002 | Li et al. .................. 455/245.1 |

FOREIGN PATENT DOCUMENTS

| EP | 1102413 | 5/2001 |
| WO | 9810523 | 3/1998 |
| WO | 0051254 | 8/2000 |

* cited by examiner

*Primary Examiner*—Nguyen T. Vo
(74) *Attorney, Agent, or Firm*—Philip R. Wadsworth; Charles D. Brown; Howard H. Seo

(57) ABSTRACT

A system and method for canceling DC offset for Mobile Station Modems having direct conversion architectures. The present invention is a fast acquiring DC offset cancellation block that provides rapid and accurate DC offset estimates and cancellation techniques to support direct conversion architectures. The fast acquiring DC offset cancellation block combines four mechanisms to rapidly acquire and remove a DC offset estimate after power up, temperature changes, receiver frequency changes, and gain setting changes by increasing high pass loop bandwidth and adjusting DC offset levels at baseband. After removing the DC offset in large portions, the high pass loop bandwidth is decreased to fine tune the previous estimate and to remove any small variation in DC offset due to receiver self-mixing products.

23 Claims, 19 Drawing Sheets

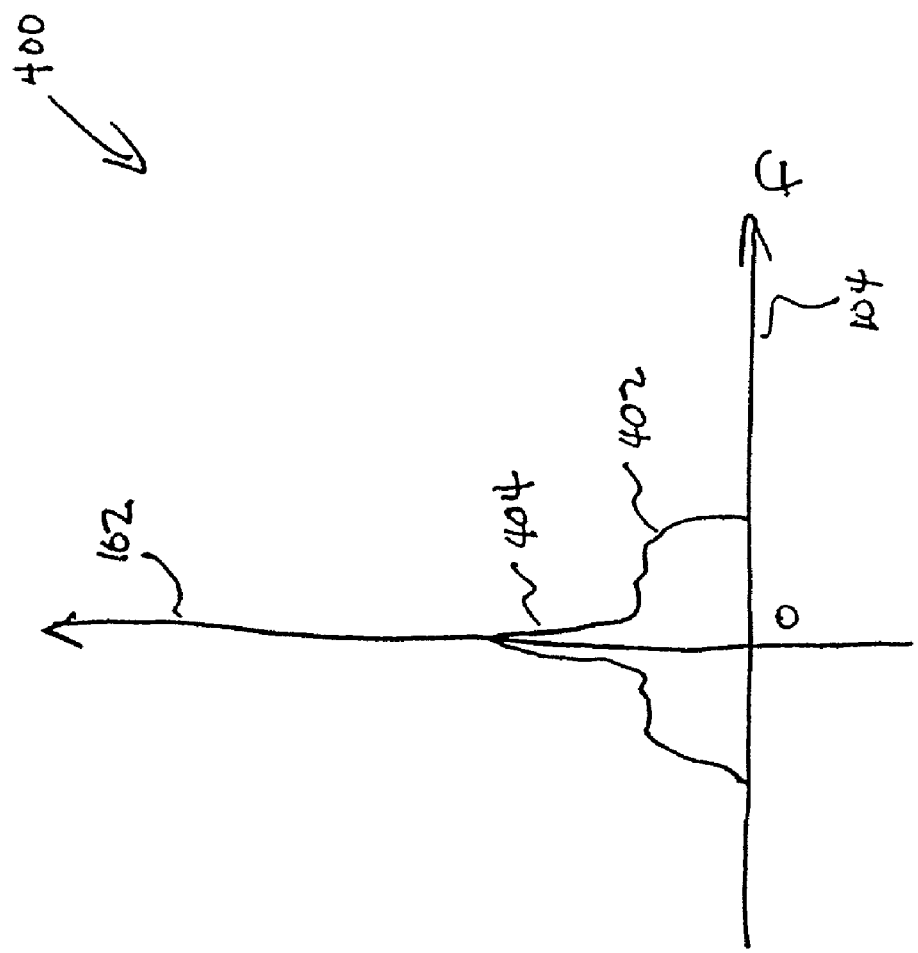

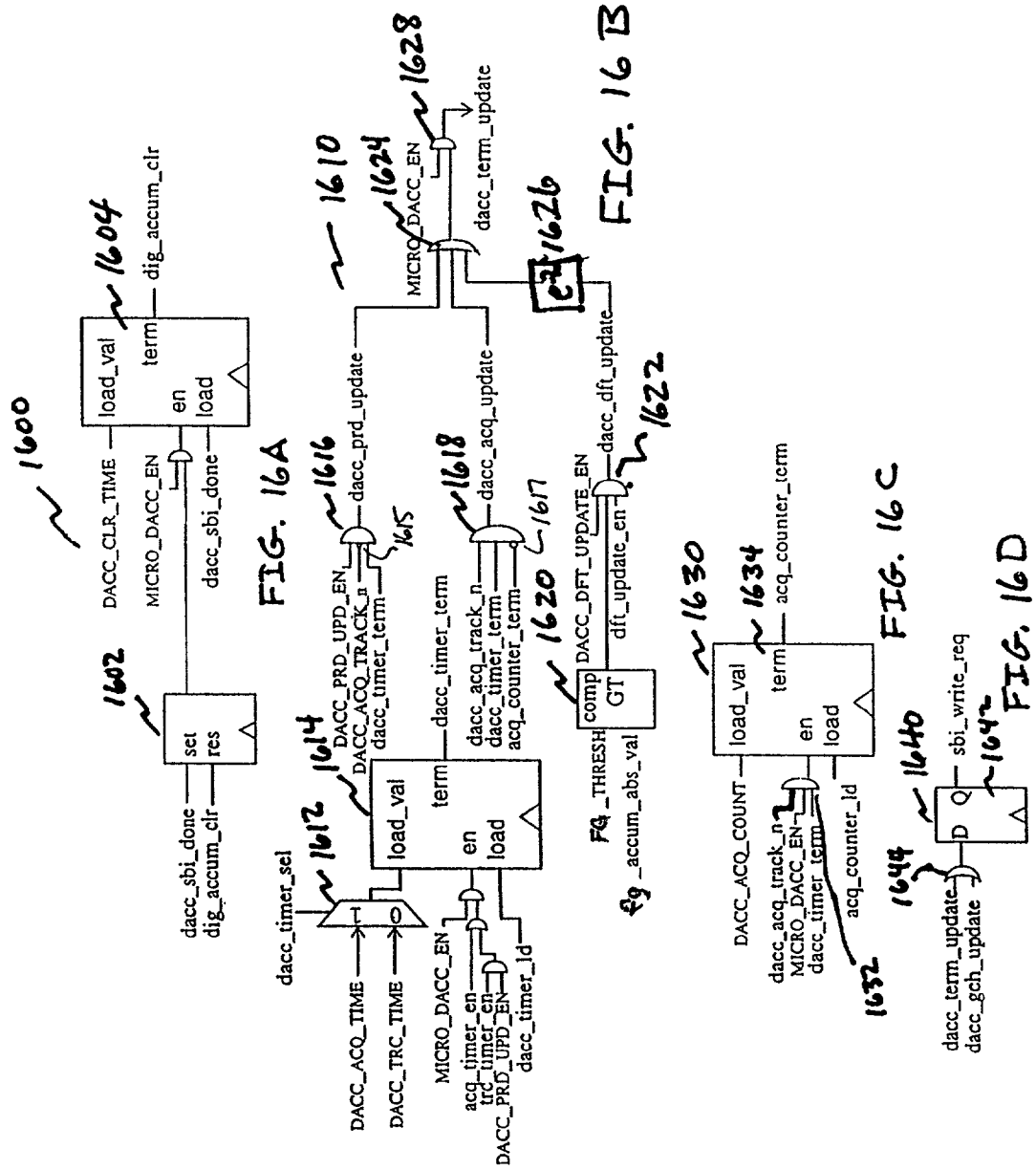

DIRECT CURRENT OFFSET CANCELLATION FOR MOBILE STATION MODEMS USING DIRECT CONVERSION

RELATED APPLICATIONS

This application claims priority to U.S. Provisional Application No. 60/371,692 filed on Apr. 9, 2002.

BACKGROUND OF THE INVENTION

1. Field of the Invention

The present invention relates generally to telecommunications, and more particularly to a system and method for removing unwanted direct current (DC) offsets from baseband signals for mobile station modems (MSMs).

2. Background Art

Conventional methods of down converting a Radio Frequency (RF) signal to baseband require two conversion steps. The RF signal is first down converted to an intermediate frequency (IF) signal. Then, the IF signal is down converted to a baseband signal. In a mobile telecommunication environment, this requires a radio frequency receiver (RFR) chip, an intermediate frequency receiver (IFR) chip, a baseband receiver chip, and other associated surrounding chips, all of which are expensive for mobile phone manufacturers.

A direct conversion enables the direct conversion of RF signals to baseband signals in a single step. Thus, direct conversion eliminates the need for the RF to IF conversion step, and thus, the IFR chip.

One of the problems associated with direct conversion is that it results in very high direct current (DC) offset levels. These unwanted DC offsets include static DC levels as well as time varying DC levels. The sources of static and time-varying DC offsets include circuit mismatch, LO self-mixing, and interferer self-mixing, each of which may vary with gain setting, frequency, fading, and temperature. If such DC offsets are not cancelled, they degrade signal quality, limit dynamic range through saturation, and increase power consumption.

What is needed is a system and method that cancels DC offsets for direct conversion architectures. What is also needed is a system and method that compensates for static DC levels and time varying DC levels for direct conversion architectures. What is further needed is a system and method that acquires and cancels DC offsets in a fast and efficient manner for direct conversion architectures.

BRIEF SUMMARY OF THE INVENTION

The present invention solves the above-mentioned problems by providing a system and method for canceling DC offsets for Mobile Station Modems having direct conversion architectures. The present invention is a fast acquiring DC offset cancellation block that provides rapid and accurate DC offset estimates and cancellation techniques to support direct conversion architectures. The fast acquiring DC offset cancellation block combines four mechanisms to rapidly acquire a DC offset estimate after power up, temperature changes, and gain changes by increasing loop bandwidth. After removing the DC offset in large portions, the bandwidth of the loop is decreased and time constants are increased to fine tune the previous estimate.

The present invention provides an inexpensive solution for receiving and transmitting CDMA waveforms for a direct conversion architecture using a digital baseband receiver and a radio frequency receiver, called a Mobile Station Modem (MSM). Further features and advantages of the invention, as well as the structure and operation of various embodiments of the invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 4 illustrates the spectrum of a desired baseband signal with an undesired time-varying DC component.

FIG. 16A is a diagram illustrating a DAC controller timing circuit for determining the length of time of a waiting period to clear the accumulator after a new DC offset estimate has been updated according to an embodiment of the present invention.

FIG. 16B is a diagram illustrating a counter circuit for a DAC controller according to an embodiment of the present invention.

FIG. 16C is a diagram illustrating a DAC controller acquisition counter circuit 1630 according to an embodiment of the present invention.

FIG. 16D is a diagram illustrating a circuit for requesting an SBI write for a DAC controller according to an embodiment of the present invention.

Figure 1:
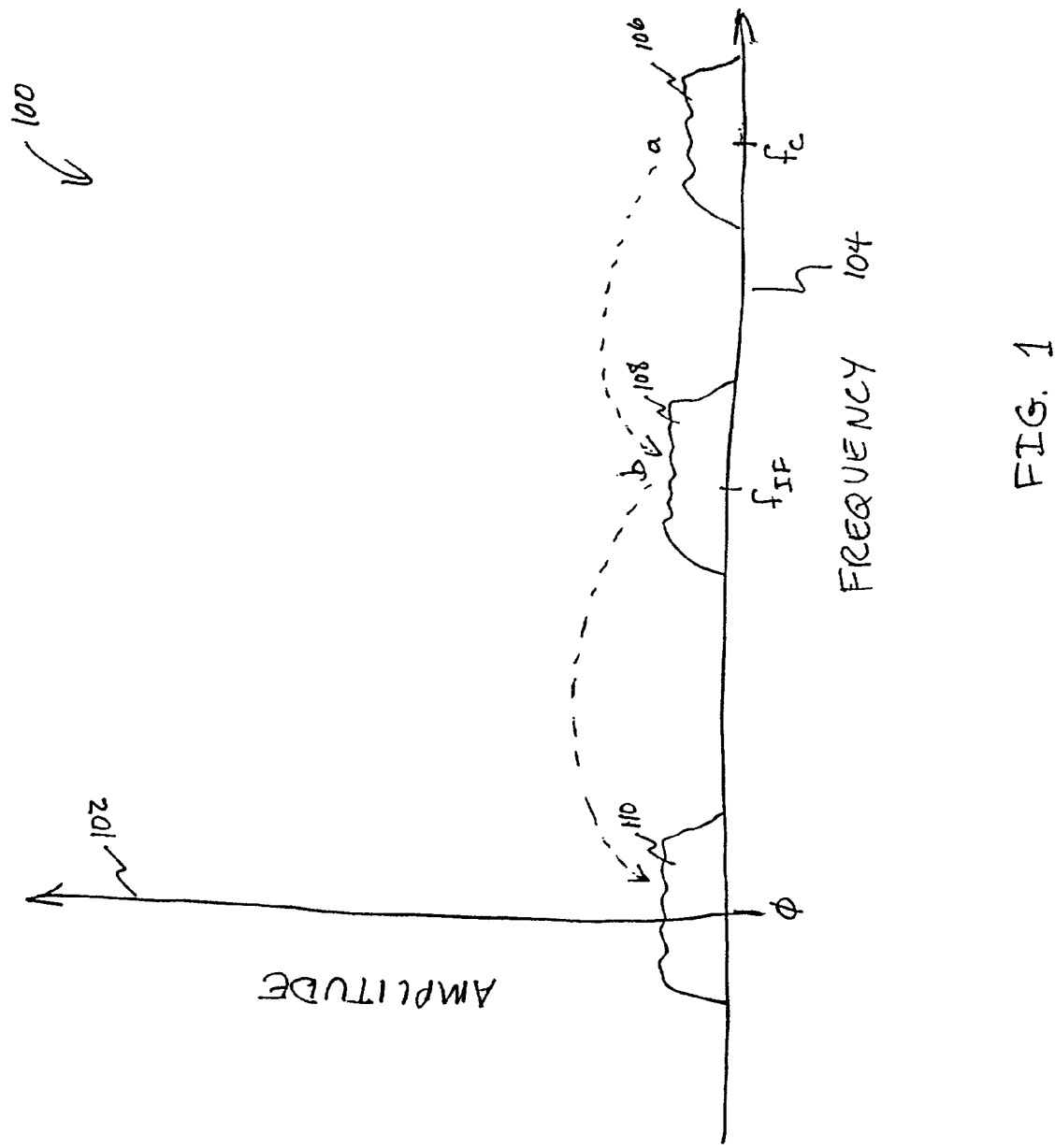
FIG. 1 is a diagram illustrating a conventional method for down converting an RF signal to a baseband signal.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawing in which an element first appears is indicated by the digit(s) to the left of the two rightmost digits in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The present invention is a system and method for removing unwanted DC offsets from a signal for a Mobile Station Modem (MSM) having a direct conversion architecture. The present invention accomplishes this by employing a fast acquiring DC offset cancellation block. The fast acquiring DC offset cancellation block removes the unwanted DC offsets from the signal using four interacting mechanisms. The interacting mechanisms include an offset adjustment, a coarse-grain pulse density modulator (PDM) loop, a fine-grain (digital) loop, and a DAC (digital-to-analog converter) controller (DACC).

Prior to describing the fast acquiring DC offset cancellation block in detail, an overview of a conventional RF-to-baseband conversion, a direct conversion, and the problems associated with direct conversion will be described.

FIG. 1 is a diagram illustrating a conventional method for down converting an RF signal to a baseband signal. FIG. 1 shows a graph 100 comprising a y-axis 102 displaying the relative amplitude of an RF signal 106, an IF signal 108, and a baseband signal 110 at a particular frequency along an x-axis 104. In this example, RF signal 106 is a CDMA signal centered at frequency fc. As previously stated, the conversion of an RF signal to a baseband signal is normally done in two steps. In step a, RF signal 106 is converted down to IF signal 108. In step b, IF signal 108 is converted down to baseband signal 110 centered at zero frequency.

Figure 2:
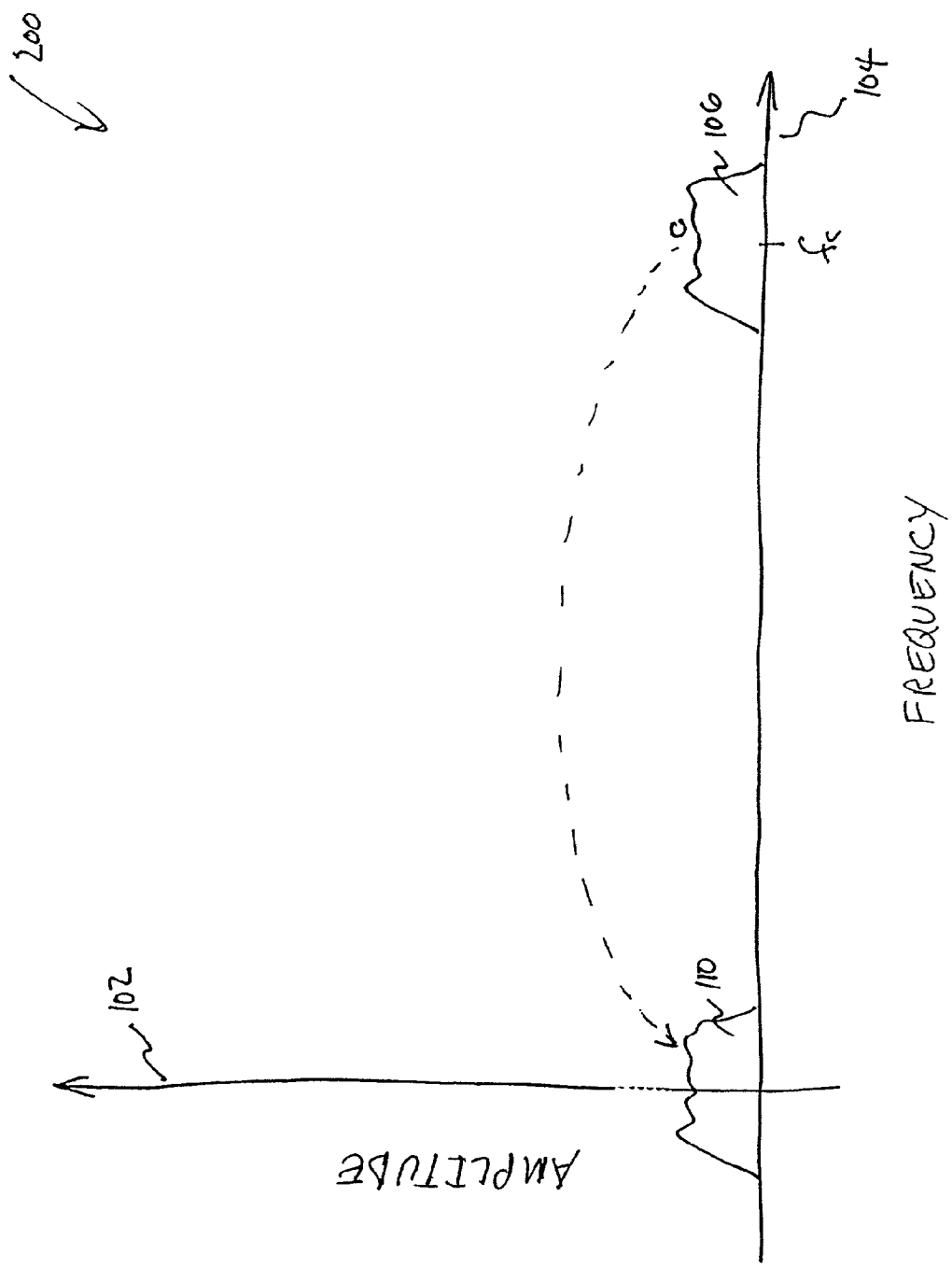
FIG. 2 is a diagram illustrating a direction conversion method for down converting an RF signal to a baseband signal.

FIG. 2 is a diagram illustrating direct conversion of an RF signal to a baseband signal. FIG. 2 shows a graph 200 comprising y-axis 102 displaying the relative amplitude of RF signal 106 and baseband signal 110 at a particular frequency along x-axis 104. The conversion of RF signal 106 to baseband signal 110 is accomplished in one step (step c) with direct conversion. Thus, direct conversion eliminates the need to convert RF signal 106 to IF signal 108.

Figure 3A:
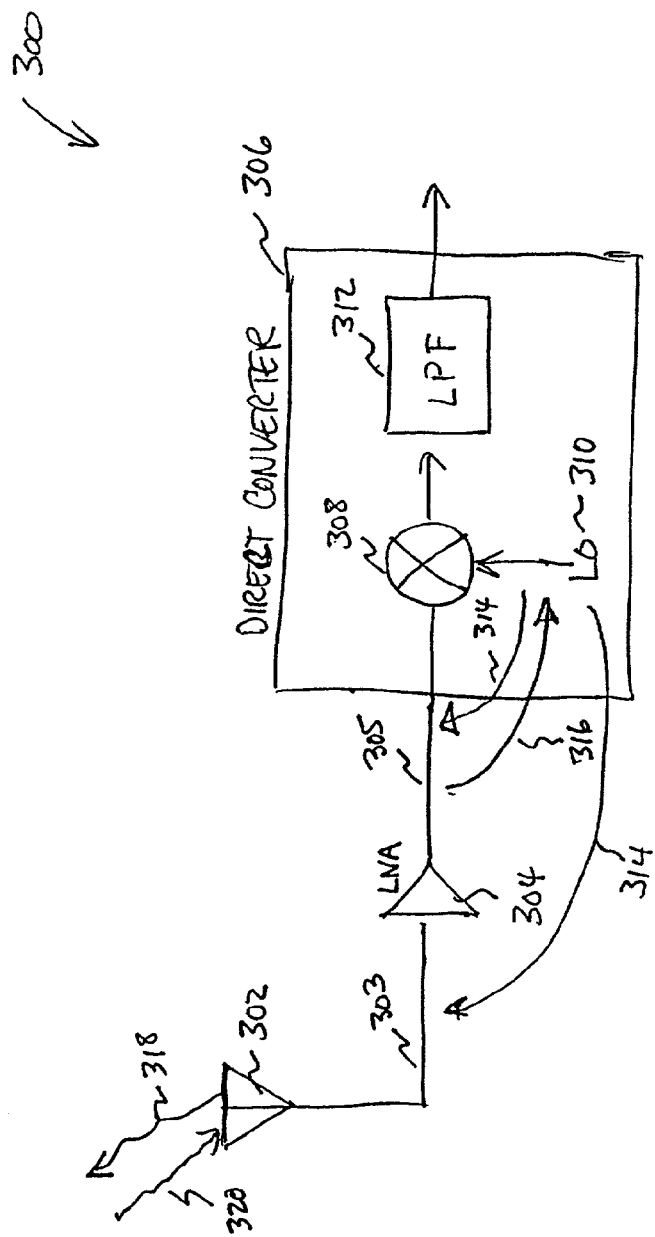
FIG. 3A is a diagram illustrating problems associated with a direct conversion method for down converting an RF signal to a baseband signal.

As previously stated, although direct conversion eliminates the need to convert from RF to IF, and thus, eliminates the need to incorporate an IFR into the system, direct conversion generates unwanted DC offsets that can degrade signal quality, limit dynamic range through saturation, and increase power consumption. FIG. 3A is a block diagram illustrating some of the problems associated with direct conversion in an RF receiver/transmitter system 300. RF receiver/transmitter system 300 comprises, inter alia, an RF antenna 302, a low noise amplifier 304, and a direct converter 306. Direct converter 306 comprises, inter alia, a mixer 308, a local oscillator (LO) 310, and a low pass filter (LPF) 312.

Antenna 302 is coupled to LNA 304. LNA 304 is coupled to direct converter 306, and in particular, mixer 308. Local oscillator 310 is coupled to mixer 308. Mixer 308 is also coupled to LPF 312.

RF antenna 302 receives and transmits RF signals, such as CDMA signals. Low noise amplifier 304 controls the gain of the RF signals. Direct converter 306 converts the RF signal to baseband by mixing the incoming RF signal with a local oscillator signal via mixer 308 and local oscillator 310. Local oscillator 310 comprises a strong frequency generator (not shown). In this example, the local oscillator frequency is the center frequency of a CDMA band. The output of mixer 308 provides a baseband signal centered around a frequency of zero. Low pass filter 312 filters the mixer output in order to eliminate signals from all other bands.

An RF signal coming in through antenna 302 passes through low noise amplifier 304. Amplifier 304 adjusts the gain of the RF signal. The RF signal is then mixed with a local oscillator signal via mixer 308 and local oscillator 310 to generate a baseband signal. The baseband signal output from mixer 308 is passed through low pass filter 312 to eliminate all signals outside of the baseband frequencies.

Problems associated with direct converter 306 that may result in the generation of DC offsets are also illustrated in FIG. 3A. For example, local oscillator 310 may comprise a strong frequency generator in which leakage from the substrate of the analog die may cause the frequency generated by local oscillator 310 to leak onto wires 303 and 305 from antenna 302 and amplifier 304, respectively, as shown by arrows 314. The signal coming in from antenna 302 may also leak onto local oscillator 310, as shown by arrow 316.

Antenna 302 transmits and receives signals. Thus, some of the leakage from local oscillator 310 may be transmitted from antenna 302, as shown by arrow 318, reflect off of an object (not shown), such as a building, a car, etc., and enter into antenna 302, as shown by arrow 320. When the local oscillator signal leaks onto the RF path, it will mix with itself to produce DC at the output of mixer 308. This may also occur when the local oscillator signal leaks onto the RF path and is reflected back into antenna 302 and/or when interference on the RF port leaks onto the local oscillator port of mixer 308. Circuit mismatch, although not related to direct converter 306, may also produce DC offsets. Such leakage and mismatch causes the baseband signal generated from direct converter 306 to produce a large time-varying DC component at zero frequency.

Figure 3B:
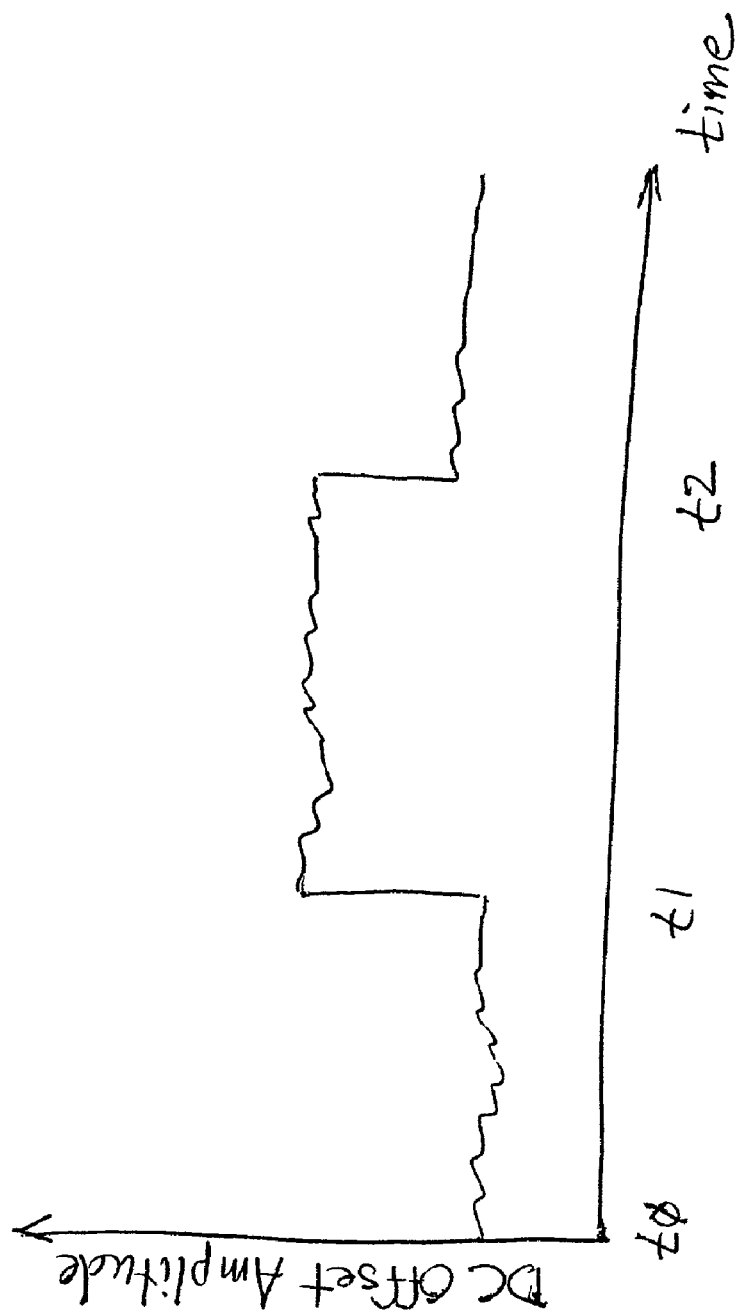
FIG. 3B is a timing diagram illustrating the effect of receiver gain changes to DC offset levels at baseband.

LNA 304 and mixer 308 will rapidly change gain based on the signal strength of the received input signal. The size of the DC offset is related to the particular gain setting of LNA 304 and/or mixer 308. FIG. 3B is a timing diagram illustrating the effect of changes in gain to DC offset levels seen at baseband. The DC offset from time t0 to t1, may also contain time-varying and static components. Time-varying components can be caused by variations in temperature, receive frequency, and/or fading. Temperature changes typically result in slow DC offset changes. Changes in DC offsets due to frequency are the result of changes in the receive frequency. DC offset changes due to fading are based on the Doppler effect producing time-varying DC offset with frequency components of up to twice the Doppler frequency. The DC offset from time t1 to t2 may contain time-varying and static DC offset components, similar to the DC offset from time t0 to t1.

A gain change occurs at time t1. At time t1, the gain change causes a large instantaneous increase in DC offset. At time t2, another gain change occurs. Again, the change in gain causes an instantaneous change in DC offset similar to the gain change at time t1. Quantitatively, the DC offset change due to baseband gain changes may be the largest of all DC offsets. When a receiver gain change will occur and how much it will change are known factors. Using the present invention, the instantaneous, static, and time-varying DC offsets can be removed.

FIG. 4 is an illustration of an exemplary baseband signal 402 generated using direct conversion and having a large DC component 404. Using the present invention, large DC component 404 can be removed. The present invention accomplishes this by opening the bandwidth of the DC offset acquire circuit (DACC block) when a gain change occurs to acquire the DC offset very rapidly for removal. This enables the coarse determination of static DC offset levels. Once the coarse static DC offset levels are obtained and removed at the output of mixer 308 using a digital-to-analog converter, the present invention narrows the bandwidth of the DC offset acquire circuit (DACC block) to track small variations in DC offset for removal without degrading the received quality due to the removed signal spectrum.

Figure 5:
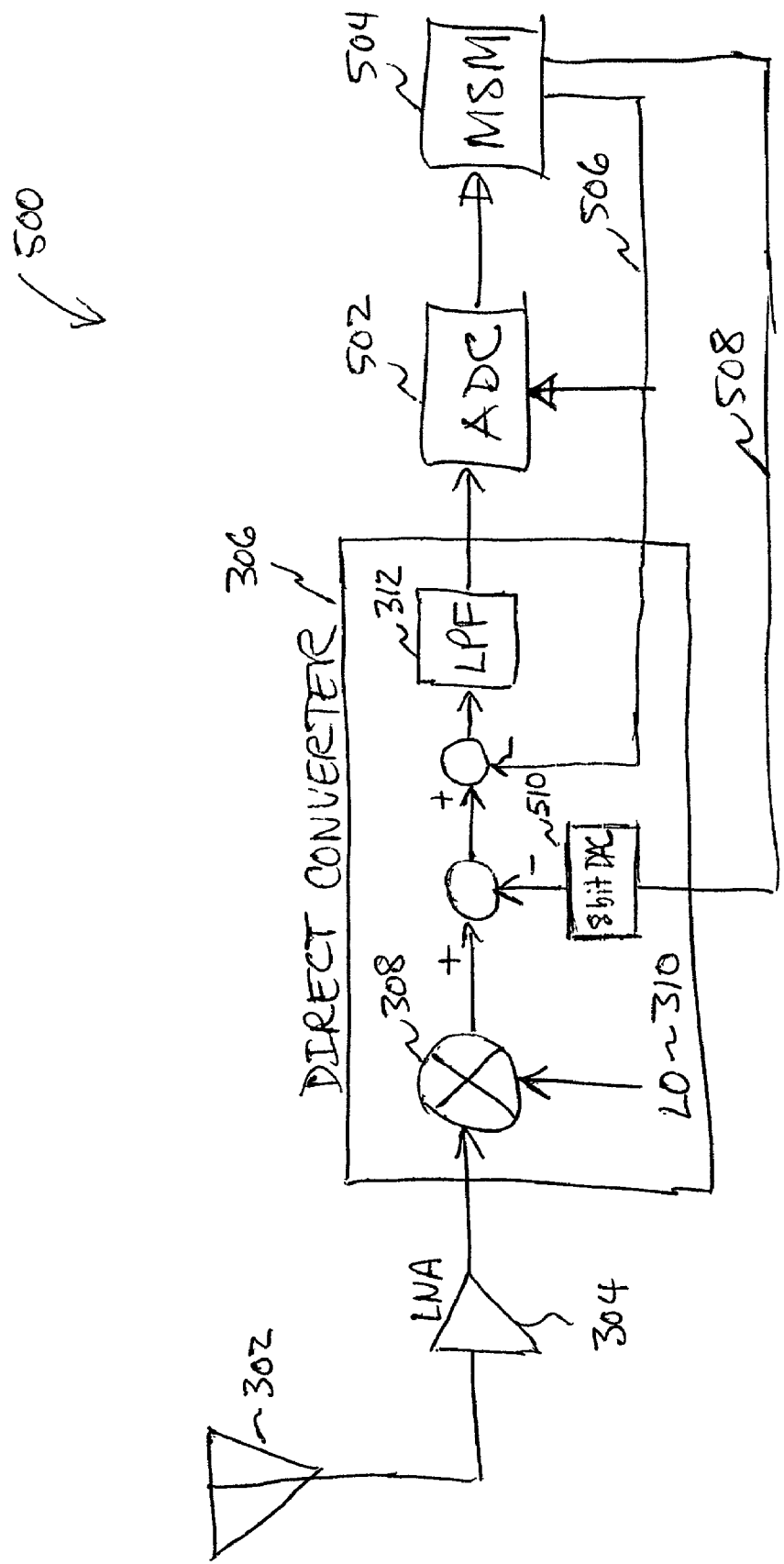
FIG. 5 is a block diagram of a fast acquiring DC offset cancellation block according to an embodiment of the present invention.

The present invention removes DC offsets, such as DC offset component 404, by incorporating a fast acquiring DC offset cancellation block. A high level block diagram 500 of a fast acquiring DC offset cancellation block for a Mobile Station Modem (MSM) is shown in FIG. 5. Block diagram 500 is similar to RF receiver/transmitter system 300, but further comprises an analog-to-digital converter 502 that is coupled to direct converter 306, and in particular, LPF 312, and a Mobile Station Modem 504 coupled to analog-to-digital converter 502. Analog-to-digital converter 502 performs analog-to-digital conversions of the baseband signals generated by direct converter 306. Fast acquiring DC offset cancellation block removes unwanted DC offsets from the baseband signal by subtracting out an estimate of the amount of DC generated within the system. This is done in several places. DC offset removal is performed internally within MSM 504. DC offset removal is performed by feeding an output of MSM 504 back into analog-to-digital converter 502 or the input of LPF 312, thereby forming a feedback loop 506. DC offset removal is also performed using another feedback loop 508 from MSM 504 to the input of LPF 312 via an 8-bit DAC 510.

Figure 6:
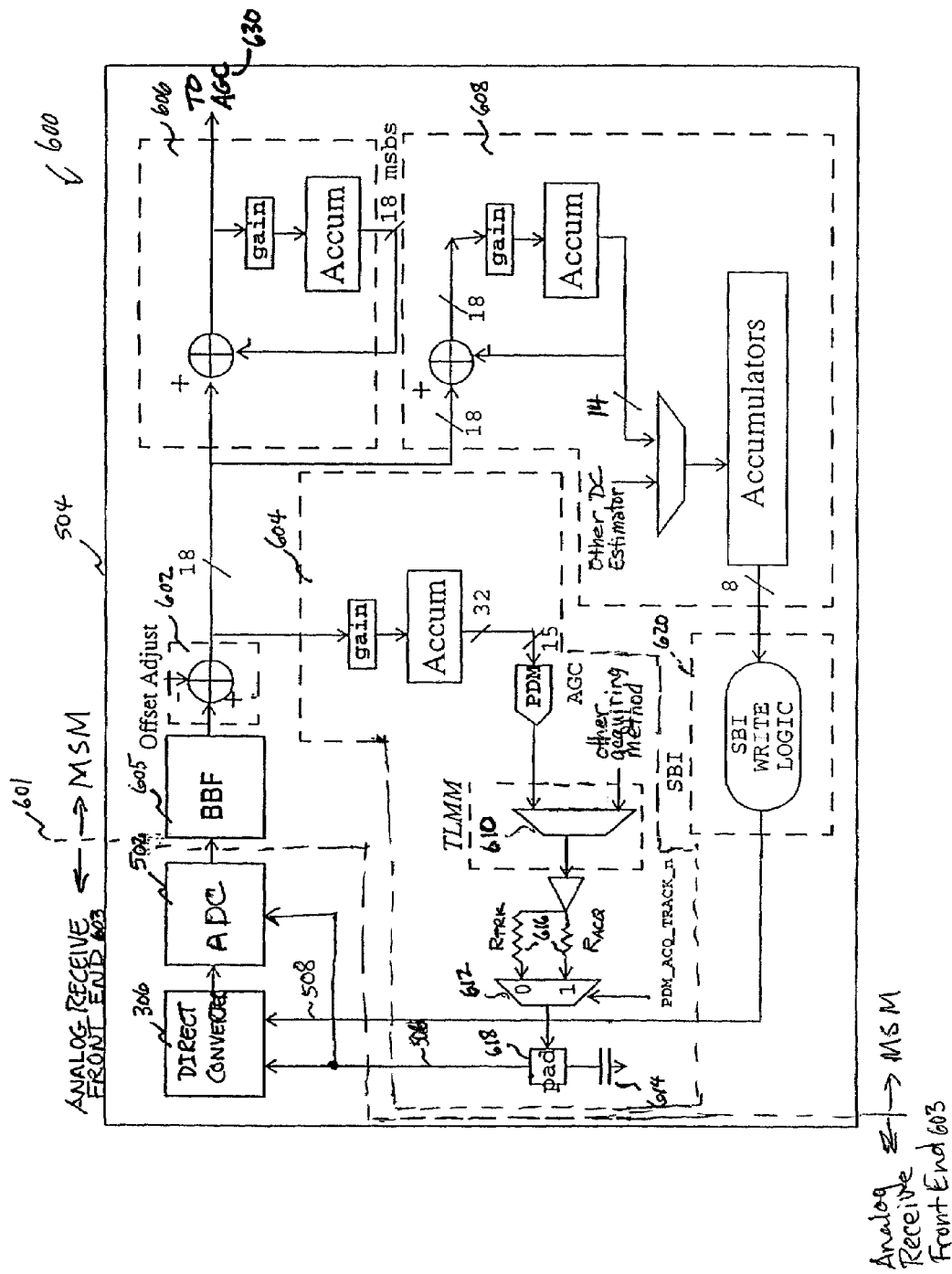
FIG. 6 is a detailed block diagram of a fast acquiring DC offset cancellation block according to an embodiment of the present invention.

FIG. 6 is a more detailed block diagram 600 of the fast acquiring DC offset cancellation block of the present invention. A phantom line 601 in block diagram 600 separates an analog receive front end portion 603 from MSM 504 of the fast acquiring DC offset cancellation block. The fast acquiring DC offset cancellation block comprises direct converter 306 and analog-to-digital converter 502, all of which are located within analog receive front end 603. The fast acquiring DC offset cancellation block further comprises a baseband filter 605, four mechanisms 602, 604, 606, and 608 that interact with one another to remove the unwanted DC offsets, and a serial bus interface 620, all of which are located within MSM 504. The four mechanisms include an offset adjustment 602, a coarse-grain (PDM) loop 604, a fine-grain (digital) loop 606, and a DAC controller 608. The four mechanisms 602, 604, 606, and 608 may be used independently or in combination with one another, depending on the mode of the system.

Offset adjustment 602 operates in the digital domain. Offset adjustment 602 is a programmable value (representing an estimate of the DC offset) that is subtracted from the baseband signal. The programmable value is stored in a microprocessor programmable register and may be updated at any time.

Coarse-grain (PDM) loop 604 operates in both the digital and analog domains. Coarse-grain (PDM) loop 604 removes the DC offset from the baseband signal after offset adjustment 602. The DC offset in the baseband signal is removed through feedback loop 506 to direct converter 306 or ADC 502 of analog receive front end 603.

Fine-grain (digital) loop 606, as its name suggests, operates in the digital domain. Fine-grain (digital) loop 606 removes the DC offset that remains after coarse-grain (PDM) loop 604 or any other method of coarse removal of the DC offset. This is performed through a small digital feedback loop within MSM 504.

DAC controller 608 also operates in the digital domain. DAC controller 608 computes periodic DC offset values depending on temperature and gain setting, and writes these values back to digital-to-analog converter 510 in direct converter 306 over a serial bus interface (SBI) represented by feedback loop 508.

The fast acquiring DC offset cancellation block operates in one of several modes depending on which of the four mechanisms 602, 604, 606, and 608 are needed to remove the DC offset. The four mechanisms 602, 604, 606, and 608 may be used individually or in combination to provide the required DC offset correction. Examples of possible combinations are shown in Table 1. Although five modes are shown in Table 1, the present invention is not limited to these five modes. Other combinations are also possible.

In the DACC only mode, DACC 608 periodically, or when triggered, updates direct converter 306 with DC offset estimates through SBI interface 620. The DC offset estimates are based on temperature, gain setting of low noise amplifier (LNA) 304 and mixer 308, and other factors. Coarse grain (PDM) loop 604 is disabled in the DACC only mode.

In the DACC and PDM mode, DACC 608 and coarse grain (PDM) loop 604 are employed. DACC 608 is used once at start-up, and then it ceases to operate. However, the DC offset estimate used to update direct converter 306 during start-up is preserved and applied in direct converter 306 during the consecutive operation. After disabling DACC 608, coarse grain (PDM) loop 604 is enabled. Coarse grain (PDM) loop 604 is used to track and acquire any changes in the DC offset.

In the DACC and fine grain mode, DACC 608 and fine grain (digital) loop 606 are employed. DACC 608 updates direct converter 306 with coarse DC offset estimates through SBI interface 620. Fine grain (digital) loop 606 is used to remove any residual offset. Coarse grain (PDM) loop 604 is disabled in the DACC and fine grain mode.

In the PDM and fine grain mode, coarse grain (PDM) loop 604 and fine grain (digital) loop 606 are employed. Coarse grain (PDM) loop 604 is used to coarse track and acquire the DC offset. Fine grain (digital) loop 606 is also operating to remove the time varying DC offset that remains after coarse grain (PDM) loop 604. During this mode, DACC 608 is never used to update DAC 510 in direct converter 306.

The last mode of operation is the offset adjust and DACC mode. In this mode of operation, a static offset adjustment is placed in a register and subtracted from the broadband signal at the output of baseband filter 605. This allows the DC offset seen at the input of LPF 312 or ADC 502 to be kept small in the event that LPF 312 and/or ADC 502 produce large inherent DC offsets. The broadband signal is then passed to DACC 608 and the DC offset estimate is fed back to direct converter 306. This method prevents analog-to-digital converter 502 from saturating, and thus, enables analog-to-digital converter 502 to have better range for removing DC or it improves the linearity and dynamic range of LPF 312 by minimizing the static DC offset at the input of LPF 312. In one embodiment, a method for determining the offset adjust register value is as follows. The input of LPF 312 is shorted for this method. Initially, zero is placed in the offset adjustment register until an estimated value of the DC offset is accumulated in fine grain (digital) loop 606. A microprocessor will read the estimated value of the DC offset from a register within fine grain (digital) loop 606, and write that value to the offset adjustment register to enable the DC offset to be removed using offset adjustment 602 prior to the baseband signal entering DACC 608 or fine grain (digital) loop 606.

TABLE 1

| MODE | DESCRIPTION |
| --- | --- |
| DACC only | The DACC updates direct converter with DC offset estimates through the SBI interface. The coarse grain (PDM) loop is disabled. |
| DACC and PDM | The DACC is used once at start up, then it ceases to operate. However, the Coarse Grain (PDM) loop is enabled and used for tracking and acquiring any DC offset changes. |
| DACC and Fine Grain | The DACC updates the direct converter with coarse DC offset estimates through the SBI interface. The fine grain loop is used to remove any residual offset. The coarse grain (PDM) loop is disabled. |
| PDM and Fine Grain | The Coarse Grain (PDM) Loop is used for coarse acquisition and tracking. The Fine Grain Loop removes any residual DC offset. The DACC is disabled. |
| Offset Adjustment and DACC | Initially, the Offset Adjustment is set to zero and the coarse grain (PDM) loop is used to determine the amount of DC offset needed. Once the DC offset has been determined, then the Offset Adjustment is set to the DC offset value and subtracted from the signal prior to the signal entering the DACC block. The DACC is used for acquisition and tracking. This prevents the ADC from saturating or improves the linearity and dynamic range of the LPF. |

Each of the four mechanisms 602, 604, 606, and 608 include an in-phase (I) component and a quadrature (Q) component. The I and Q components for each mechanism (602, 604, 606, and 608) are identical. Thus, only one component (I or Q) of each of the four mechanisms 602, 604, 606, and 608 is shown in detail below.

Offset Adjustment Mechanism

Figure 7:
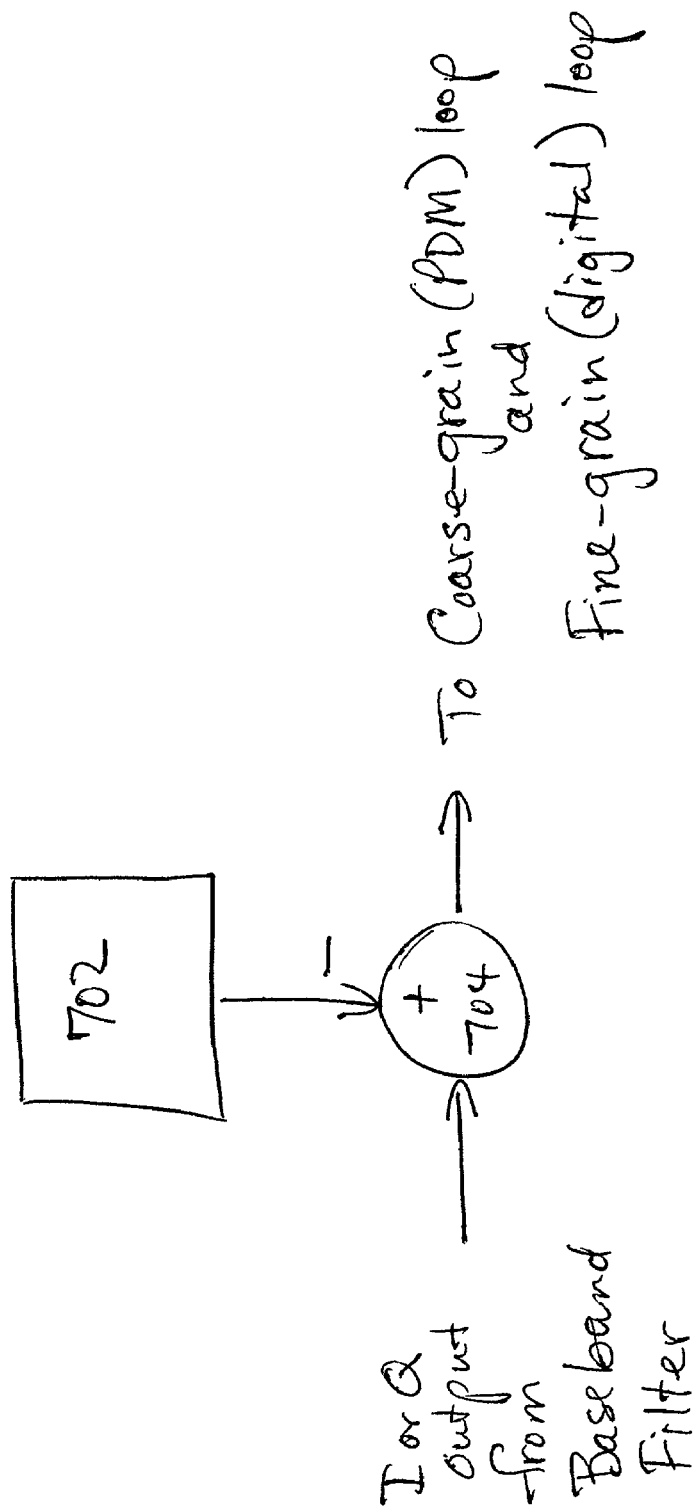
FIG. 7 is a block diagram of an offset adjustment mechanism according to an embodiment of the present invention.

FIG. 7 is a block diagram of offset adjustment 602 for either the in-phase (I) or the quadrature (Q) component of the baseband signal. Offset adjustment 602 removes static DC from LPF 312 and ADC 502 so that the DC offset voltage does not exceed certain limits at the input of LPF 312 that would degrade the linearity and dynamic range of LPF 312 or ADC 502. FIG. 7 shows offset adjustment 602 accepting the baseband signal from baseband filter 605. Offset adjustment 602 comprises a register 702 and an adder 704. Register 702 is coupled to adder 704. Register 702 is an 18-bit register. The value held in register 702 is subtracted from the output of baseband digital filter 605. The value in register 702 is microprocessor controlled. The microprocessor may choose to write any value in register 702. In one embodiment, the value of register 702 is determined by the output of an accumulator in fine grain (digital) loop 606, which is discussed in detail below. The value from the accumulator in fine grain (digital) loop 606 may be read by a microprocessor. The microprocessor will then write the accumulated value to register 702 in order to subtract a static DC offset from the output of the baseband signal.

In one embodiment, offset adjustment 602 is used. The majority of the DC offset inherent in the baseband signal will have already been removed by the other mechanisms 604, 606, and 608. However, due to the restriction on the input voltage to a baseband analog filter in direct converter 306 or ADC 502, offset adjustment 602 may need to be used. When offset adjustment 602 is needed, the value in register 702 is subtracted from the I and Q outputs of baseband digital filter 605. When offset adjustment 602 is not used, the value in register 702 is set to zero (0).

Coarse-Grain (PDM) Loop Mechanism

Figure 8:
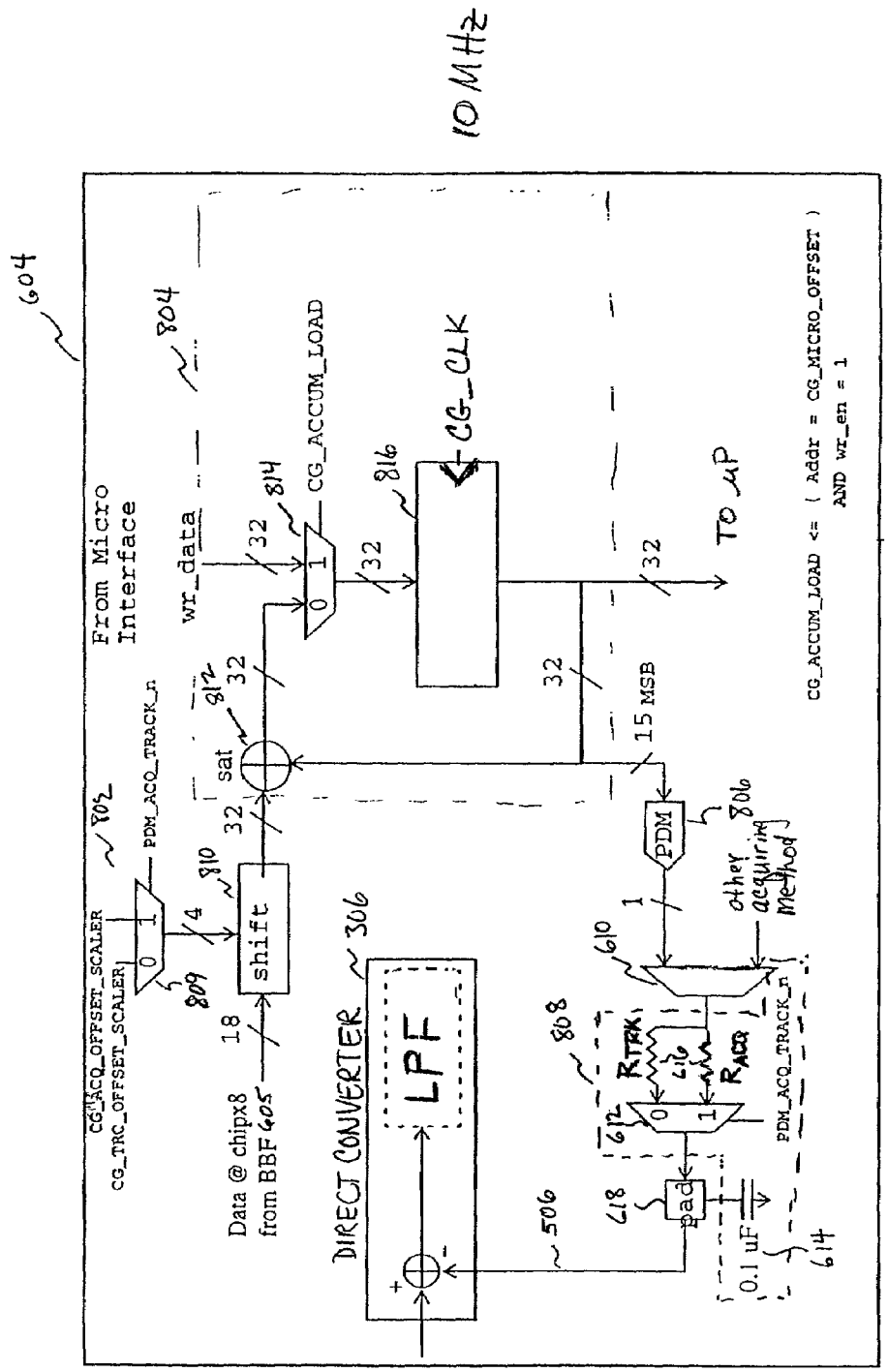
FIG. 8 is a block diagram of a coarse grain DC offset loop mechanism according to an embodiment of the present invention.

FIG. 8 is a block diagram of coarse grained (PDM) loop 604 for either the I or the Q component of the baseband signal. Coarse-grain (PDM) loop 604 removes DC offsets from the I and Q components of the baseband signal. Coarse-grain (PDM) loop 604 operates in two principal modes. The first mode is the acquisition mode. The acquisition mode is used when the digital receive front end is in the process of acquiring the DC offset. The second mode is the tracking mode. The tracking mode is used when the digital receive front end is in the process of tracking the DC offset while producing minimal degradation in the receiver performance.

FIG. 8 shows coarse-grain (PDM) loop 604 accepting either the I or the Q component of the baseband signal from baseband filter (BBF) 605. This occurs when offset adjustment register 702 is set to zero. Alternatively, coarse-grain (PDM) loop accepts either the I or Q component of the baseband signal from offset adjustment 602 after offset adjustment 602 has removed static DC from the I or Q component. The I and Q components of the baseband signal are 18-bit signals.

Coarse grain (PDM) loop 604 comprises a gain element 802, an accumulator element 804, a pulse density modulator (PDM) 806, a multiplexer 610, an RC circuit 808, and pad 618. Gain element 802 is coupled to accumulator element 804. Accumulator 804 is coupled to PDM 806. PDM 806 is coupled to multiplexer 610. Multiplexer 610 is coupled to RC circuit 808. RC circuit 808 is coupled to pad 618, and pad 618 is coupled to direct converter 306 or ADC 502 through feedback loop 506.

Gain element 802 comprises a multiplexer 809 coupled to a programmable shifter 810. Gain element 802 multiplies the input data from the I or Q component of the baseband signal by a scale factor. The scale factor is selected based on whether coarse-grain (PDM) loop 604 is in acquisition mode or track mode. A signal, PDM_ACQ_TRACK_n controls multiplexer 809. PDM_ACQ_TRACK_n is an internal signal that is controlled by a finite state machine. The finite state machine is described below with reference to FIG. 10.

If coarse grain (PDM) loop 604 is in acquisition mode, PDM_ACQ_TRACK_n signal will select a high gain, shown in FIG. 8 as coarse-grain acquire offset scaler (CG_ACQ_OFFSET_SCALER), as the output signal of multiplexer 809. This causes coarse grain (PDM) loop 604 to represent a high pass filter in the receive path with a 3 dB filter bandwidth of 1 KHz. If coarse grain (PDM) loop 604 is in track mode, PDM_ACQ_TRACK_n signal will select a low gain, shown in FIG. 8 as coarse-grain track offset scaler (CG_TRC_OFFSET_SCALER), as the output signal of multiplexer 809. This will produce a 3 dB high pass filter bandwidth of 100 Hz. The invention is not limited to the 1 KHz 3 dB bandwidth and the 100 Hz 3 dB bandwidth for acquire and track mode, respectively. One skilled in the relevant art(s) would know that other 3 dB bandwidths could be used without departing from the scope of the present invention.

Programmable shifter 810 accepts the output of multiplexer 809 and shifts the 18-bit I or Q baseband input signal by an amount designated by the selected scaler value from multiplexer 809. The output of programmable shifter 810 provides a 32-bit I or Q baseband output signal.

Accumulator 804 is used to accumulate an estimate of the DC offset in the baseband signal. Accumulator 804 comprises a saturating adder 812 coupled to a register 816 via a multiplexer 814. The output of register 816 connects to saturating adder 812, thereby providing a feedback loop. Saturating adder 812 accepts as input the incoming data from the output of programmable shifter 810 and the data being fed back from the output of register 816, and provides an output value representing the sum of the incoming I or Q data and the feedback data from register 816 for accumulating an estimate of the DC offset.

Multiplexer 814 selects either the output from saturating adder 812 or an output from a microprocessor interface (shown as wr_data). Multiplexer 814 is controlled by a CG_ACCUM_LOAD (coarse-grain accumulator load) signal. The CG_ACCUM_LOAD signal indicates whether the data from the microprocessor interface (i.e., wr_data) is to be used. Selection of the output from the microprocessor interface allows accumulator 804 to be loaded with a known value. This enables testing and debugging of coarse-grain (PDM) loop 604. Under normal operations, multiplexer 814 will select the output from saturating adder 812.

Register 816 is used to store the output value from saturating adder 812 or the output value from the microprocessor interface (not shown). A coarse grain clock signal, connected to register 816, is used to clock register 816. In one embodiment, coarse grain clock signal is a 10 MHz clock signal. One skilled in the relevant art(s) would know that other clock frequencies could be used without departing from the scope and spirit of the present invention.

The 32-bit output signal from accumulator 804 is sent to the microprocessor interface for monitoring, testing, and debugging purposes. The 15 most significant bits of the 32-bit output signal from accumulator 804 are sent to PDM 806. By truncating the least significant bits of the 32-bit output signal from accumulator 804, mechanism 604 is performing a divide.

Multiplexer 610 selects the accumulated value of the DC offset from PDM 806 or selects another conventional method for acquiring the DC offset. In another embodiment, multiplexer 610 is not used. Instead, the output of PDM 806 is passed directly to RC circuit 808.

The output of PDM 806 provides a pulse density modulated analog signal representing an estimate of the DC offset. The analog signal may contain higher frequencies introduced by PDM 806. To remove this high frequency content in the analog signal, RC circuit 808 provides low pass filtering as defined by the RC time constant. The larger the RC time constant, the smoother the analog DC offset value at the output of RC circuit 808. RC circuit 808 enables PDM 806 to produce a clean DC voltage.

PDM 806 together with RC circuit 808 build a digital-to-analog converter. PDM 806 together with RC circuit 808 convert the output of accumulator 804 to an analog signal.

RC circuit 808 comprises a resistive network 616, a capacitor 614, and a multiplexer 612. Multiplexer 612 is used to select a resistor from resistive network 616 to provide the resistive portion of the RC time constant. Multiplexer 612 is controlled by PDM_ACQ_TRACK_n. If PDM_ACQ_TRACK_n indicates that coarse-grain (PDM) loop 604 is in acquire mode, the lower resistance value is chosen to provide the RC time constant. A lower resistance value provides a smaller time constant, and thus, enables fast acquisition of the DC offset without compromising the stability of coarse-grain (PDM) loop 604. When PDM_ACQ_TRACK_n indicates that coarse-grain (PDM) loop 604 is in track mode, the larger resistance value is chosen to provide the RC time constant. A greater resistance value provides a larger time constant, and thus, reduces the noise from PDM 806.

After removal of the high frequency content from the DC offset value, the DC offset value is subtracted from the analog signal in direct conversion module 306.

Figure 9A:
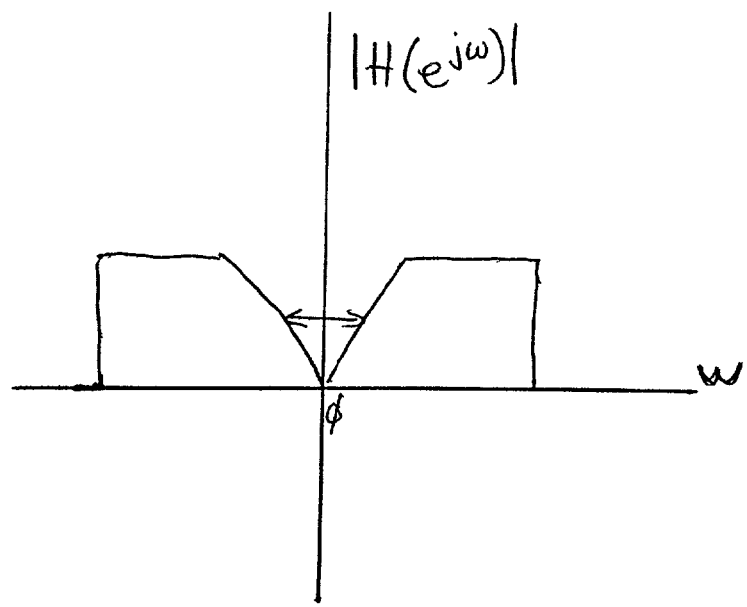
FIG. 9A is a diagram of the bandwidth for a baseband signal as a result of increased gain according to an embodiment of the present invention.

Thus, when coarse-grain (PDM) loop 604 is in acquire mode, gain element 802 is increased. An increase in the gain opens the bandwidth of the I or Q high pass filter defined by coarse-grain (PDM) loop 604, as shown in FIG. 9A, in order to acquire an estimate of the DC offset more rapidly for removal. This increase in gain causes the high pass characteristic of coarse-grain (PDM) loop 604 to be less accurate while also introducing more noise from PDM 806 since the RC time constant is lowered in acquire mode.

Figure 9B:
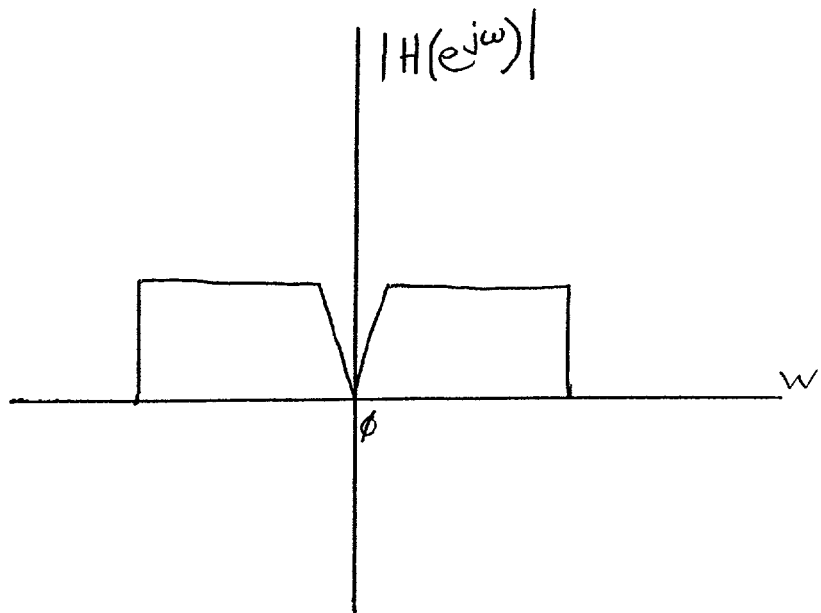
FIG. 9B is a diagram of the bandwidth for a baseband signal as a result of decreased gain according to an embodiment of the present invention.

During the tracking mode, the gain element 802 is reduced. The reduction in gain narrows the bandwidth of the I or Q high pass filter defined by coarse-grain (PDM) loop 604, as shown in FIG. 9B. This produces a higher precision estimate of the DC offset, and reduces the noise in the analog output of PDM 806 due to the higher RC time constant, thus, limiting the spectrum lost due to high pass filtering.

Figure 10:
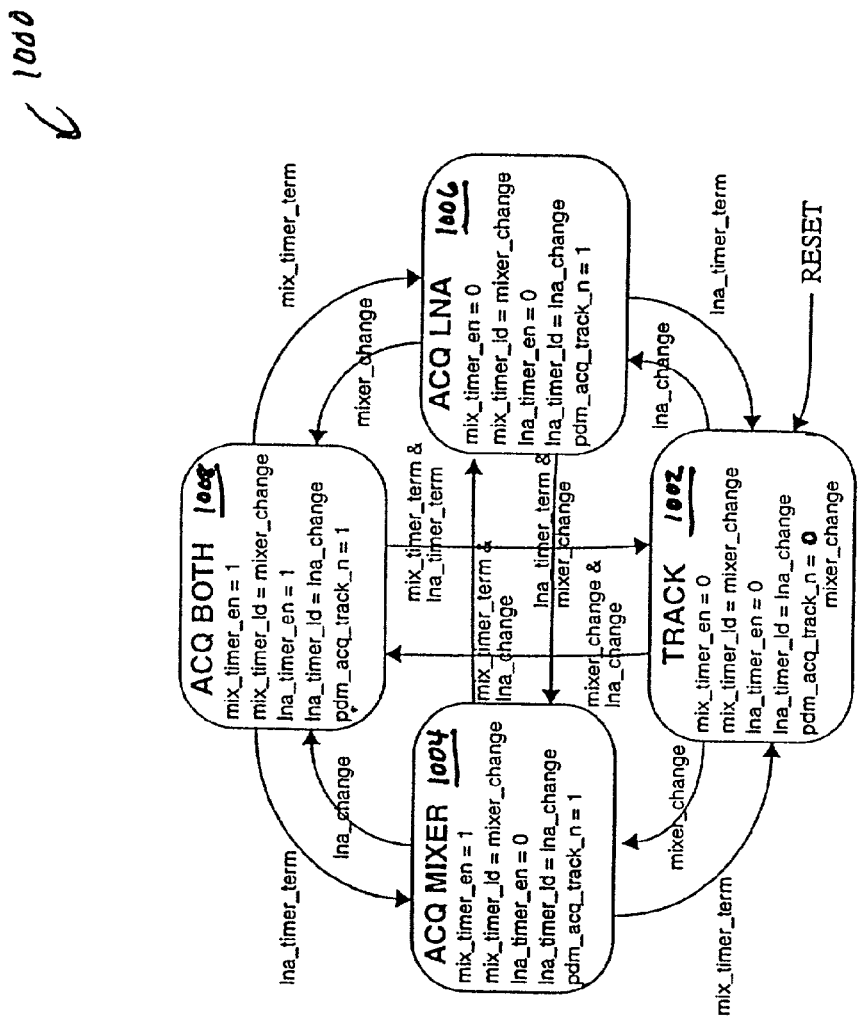
FIG. 10 is a state diagram of a PDM acquire/tracking mode FSM according to an embodiment of the present invention.

FIG. 10 is a PDM acquire/tracking mode finite state machine 1000. Although the present invention is described using a state machine, one skilled in the relevant art(s) would know that other implementations using a microprocessor may be used without departing from the scope and spirit of the invention. Finite state machine 1000 is comprised of four states: a track state 1002, an acquisition state 1004 for mixer 308, an acquisition state 1006 for low noise amplifier (LNA) 304, and an acquisition state 1008 for both mixer 308 and LNA 304 (also referred to as "acquire both" state 1008). Finite state machine 1000 operates as described below. Table 4 describes the operating modes of coarse-grain (PDM) loop 604.

On a reset signal from the microprocessor, coarse-grain (PDM) loop 604 goes into track state 1002 with PDM 806 set to 0×0. In track state 1002, the PDM loop runs with a 3 dB high pass filter bandwidth of 100 Hz slowly tracking DC offset. The RC time constant and gain element 802 are set to tracking.

Coarse-grain (PDM) loop 604 will go from track state 1002 to one of three acquire states 1004, 1006, or 1008, on a mixer change, an LNA change, or a mixer change and an LNA change, respectively. Coarse grain (PDM) loop 604 keeps running and the accumulator value of accumulator 816 is preserved during the transition from state 1002 to 1004, 1006, or 1008. RC time constant 808 and gain element 802 are set to acquire through PDM_ACQ_TRACK_n during the transition from state 1002 to 1004, 1006, or 1008.

On a mixer change, coarse-grain (PDM) loop 604 goes into mixer acquisition mode or acquire mixer state 1004. In mixer acquisition mode 1004, the PDM loop stays enabled. Preserving the accumulator value of accumulator 816 during the transition from track state 1002 to acquire mixer state 1004, the accumulator value is used as a start value for the PDM loop during acquire mode. Gain element 802 and RC time constant 808 are in acquire mode. A mixer timer (shown in FIG. 11 and described below with reference to FIG. 11) is enabled as a down-counter. If a LNA change occurs while in mixer acquisition mode 1004, coarse-grain (PDM) loop 604 will go to both mixer and LNA acquisition mode 1008 (discussed in detail below). The accumulator value of accumulator 816 is preserved during the transition from state 1004 to 1008. When the mixer timer counts down to 0, or in other words, times-out (mix_timer_term), coarse-grain (PDM) loop 604 will return to track state 1002. The accumulator value of accumulator 816 is preserved during the transition from state 1004 to 1002 and is used as a start value for the PDM loop during the consecutive tracking mode. Also, during the transition from state 1004 to 1002, RC time constant 808 and gain element 802 are set back to tracking through PDM_ACQ_TRACK_n. If the mixer timer terminates while an LNA change occurs, coarse-grain (PDM) loop 604 will go to LNA acquisition mode 1006. The accumulator value of accumulator 816 is preserved during the transition from state 1004 to 1006.

Coarse-grain (PDM) loop 604 will go from track state 1002 to LNA acquisition mode or acquire LNA state 1006 on an LNA change. In LNA acquisition mode 1006, the PDM loop stays enabled. Preserving the accumulator value of accumulator 816 during the transition from track state 1002 to acquire mixer state 1006, the accumulator value is used as a start value for the PDM loop during acquire mode. Gain element 802 and RC time constant 808 are in acquire mode. An LNA timer (shown in FIG. 11 and described below with reference to FIG. 11) is enabled as a down-counter. If a mixer change occurs while in LNA acquisition mode 1006, coarse-grain (PDM) loop 604 will go to both mixer and LNA acquisition mode 1008 (discussed in detail below). The accumulator value of accumulator 816 is preserved during the transition from state 1006 to 1008. When the LNA timer counts down to 0, or in other words, times-out (lna_timer_term), coarse-grain (PDM) loop 604 will return to track state 1002. The accumulator value of accumulator 816 is preserved during the transition from state 1006 to 1002 and is used as a start value for the PDM loop during the consecutive tracking mode. Also, during the transition from state 1006 to 1002, RC time constant 808 and gain element 802 are set back to tracking through PDM_ACQ_TRACK_n. If the LNA timer terminates while a mixer change occurs, coarse-grain (PDM) loop 604 will go to mixer acquisition mode 1004. The accumulator value of accumulator 816 is preserved during the transition from state 1006 to 1004.

Coarse-grain (PDM) loop 604 will go from track state 1002 to acquire both state 1008 on both a mixer and LNA change that occurs simultaneously. In acquire both state 1008, the PDM loop stays enabled. Preserving the accumulator value of accumulator 816 during the transition from track state 1002 to acquire mixer state 1008, the accumulator value is used as a start value for the PDM loop during acquire mode. Gain element 802 and RC time constant 808 are in acquire mode. Both the LNA timer and the mixer timer are enabled. If the LNA timer terminates prior to the mixer timer, then coarse-grain (PDM) loop 604 will go to mixer acquisition mode 1004. If the mixer timer terminates prior to the LNA timer, then coarse-grain (PDM) loop 604 will go to LNA acquisition mode 1006. If both the LNA timer and the mixer timer terminate simultaneously, coarse-grain (PDM) loop 604 will return to track state 1002. The accumulator value of accumulator 816 is preserved during any of the transitions and is used as a start value for the PDM loop in any of the new states. Also during the transition from state 1008 to 1002, RC time constant 808 and gain element 802 are set back to tracking through PDM_ACQ_TRACK_n.

TABLE 4

| Mode | Description |
| --- | --- |
| Mixer Acquire | The PDM loop is enabled with the Coarse-grain accumulator setting the PDM value. The RC time constant switches between tracking and acquisition only after a mixer gain change. CG_MIX_ACQ_TIME will determine when to return to tracking mode. |
| LNA Acquire | The PDM loop is enabled with the Coarse-grain accumulator setting the PDM value. The RC time constant switches between tracking and acquisition only after a LNA gain change. The CG_LNA_ACQ_TIME will determine when to return to tracking mode. |
| Both Acquire | The PDM loop is enabled with the coarse-grain accumulator setting the PDM value. The RC time constant switches between tracking and acquisition when ever there is a mixer gain change or a LNA gain change. The longer timer value (CG_MIX_ACQ_TIME or CG_LNA_ACQ_TIMER) will determine when to return to tracking mode. |

Figure 11:
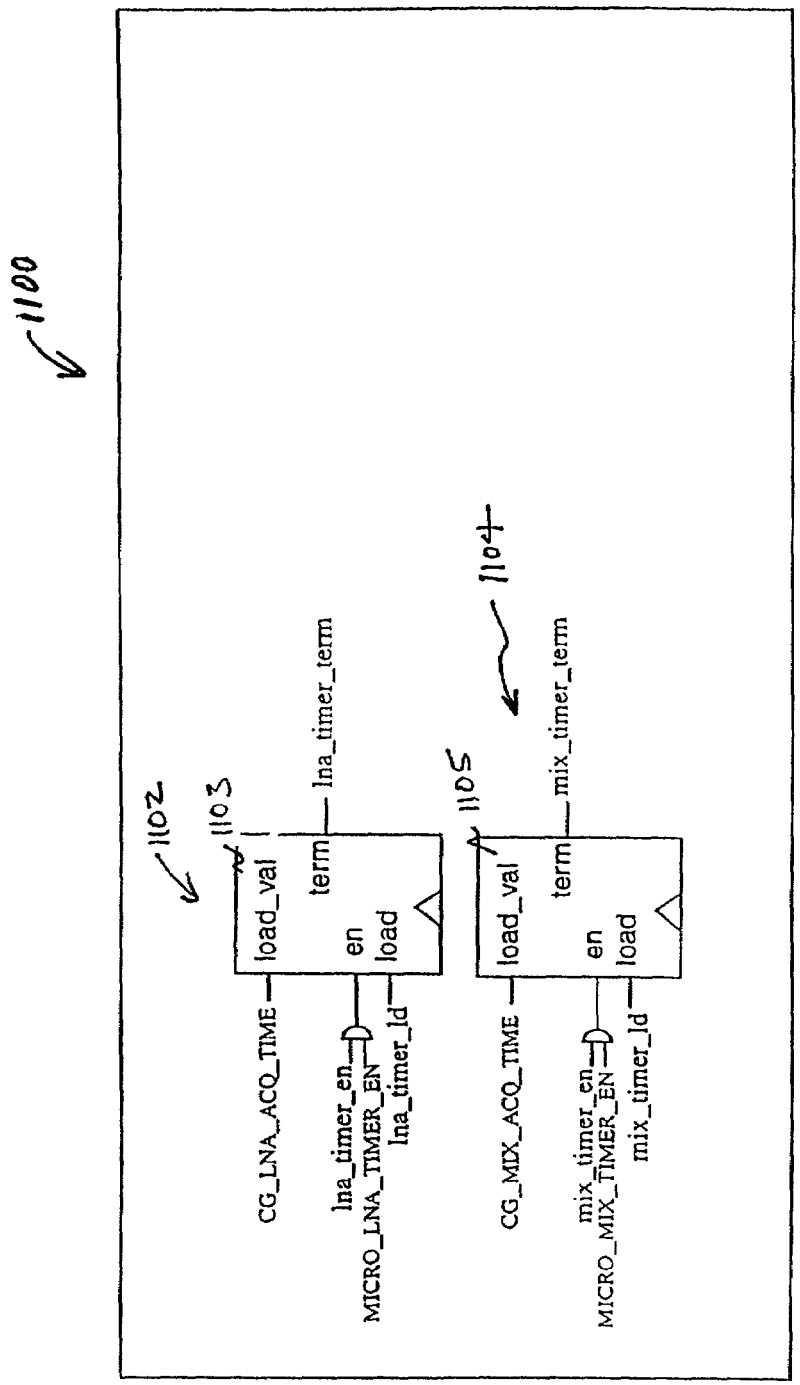
FIG. 11 is a diagram of PDM acquire/tracking mode control circuitry according to an embodiment of the present invention.

FIG. 11 is a diagram of a PDM acquire/track mode control circuitry 1100. Control circuitry 1100 includes two timer circuits 1102 and 1104 for controlling the time spent in acquire mode after an LNA gain change and a mixer gain change, respectively.

Timer circuit 1102 is comprised of a counter 1103. Timer circuit 1102 is used to determine the length of time to remain in acquisition mode after a LNA 304 gain change. lna_timer_en and lna_timer_ld are controlled by finite state machine 1000. When lna_timer_ld is set, an initial time count (CG_LNA_ACQ_TIME) is loaded into counter 1103. When MICRO_MIX_TIMER_EN and lna_timer_en are set, counter 1103 may begin counting down from CG_LNA_ACQ_TIME. When counter 1103 times-out, timer 1102 terminates. In other words, when counter 1103 reaches zero, coarse-grain (PDM) loop 604 may exit acquire mode and return to track mode. If an acquisition of the DC offset is not desired after a LNA gain change, the MICRO_LNA_TIMER_EN can be set to zero, causing state machine 1000 to operate in Mixer Acquire mode as shown in Table 4.

Timer circuit 1104 is comprised of a counter 1105. Timer circuit 1102 is used to determine the length of time to remain in acquisition mode after a mixer 308 gain change, mixer_timer_en and mixer_timer_ld are controlled by finite state machine 1000. When mixer_timer_ld is set, an initial time count (CG_MIX_ACQ_TIME) is loaded into counter 1105. When mix_timer_en and MICRO_MIX_TIMER_EN are set, counter 1105 may begin counting down from CG_MIX_ACQ_TIME. When counter 1105 times-out, timer 1104 terminates. In other words, when counter 1105 reaches zero, coarse-grain (PDM) loop 604 may exit acquire mode and return to track mode. If an acquisition of the DC offset is not desired after a mixer gain change, the MICRO_MIX_TIMER_EN can be set to zero, causing state machine 1000 to operate in LNA Acquire mode as shown in Table 4.

Fine Grain (Digital) Cancellation Loop Mechanism

Fine grain (digital) cancellation loop 606 is the most precise of the four mechanisms 602, 604, 606, and 608 for DC offset cancellation. Fine-grain (digital) cancellation loop 606 removes the DC offset from the I and Q components of the baseband signal that remains after the coarse-grain DC offset cancellation or any other offset cancellation method that is applied.

Figure 12:
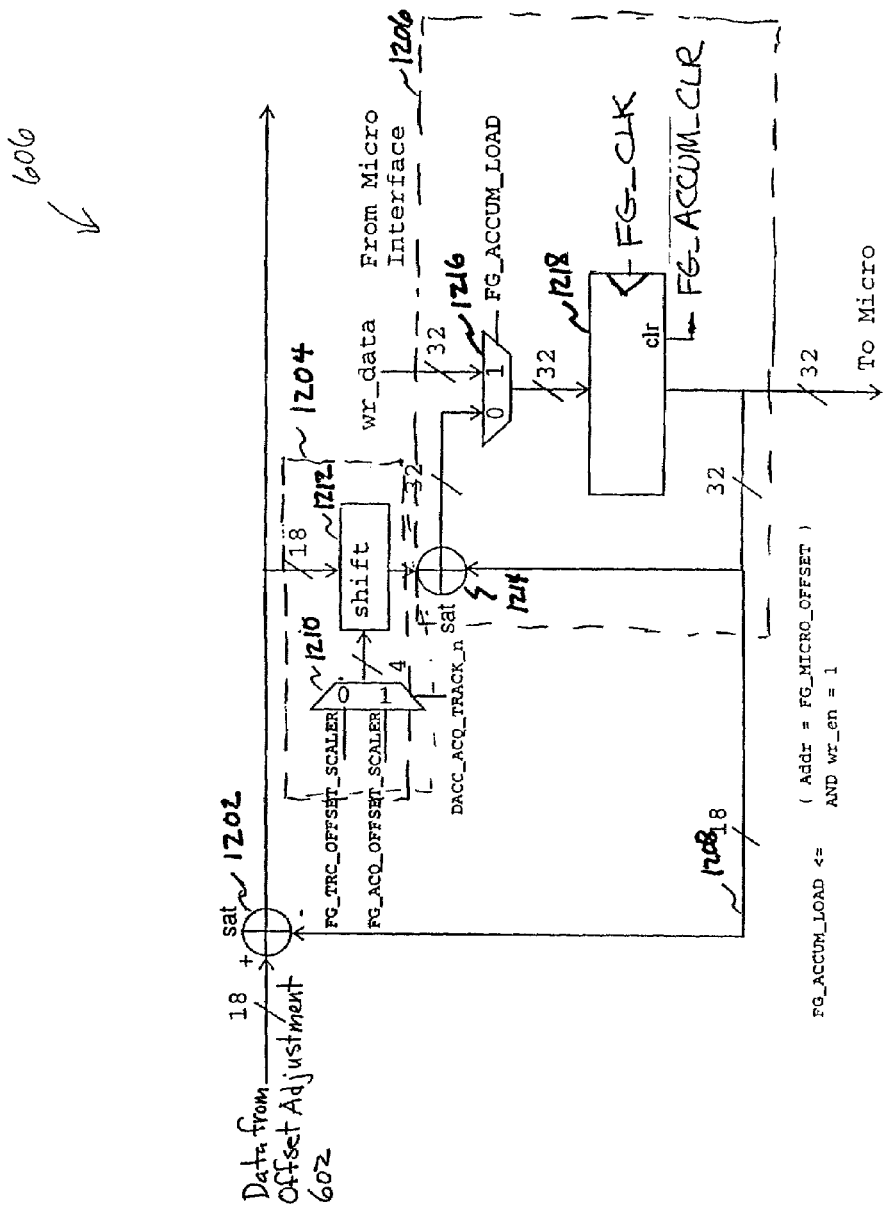
FIG. 12 is a block diagram of a fine grained (digital) cancellation loop mechanism according to an embodiment of the present invention.

A detailed block diagram of fine-grain (digital) cancellation loop 606 for either the I or the Q component of the baseband signal is shown in FIG. 12. Fine-grain (digital) cancellation loop 606 comprises a saturating adder 1202, a gain element 1204, and an accumulator 1206. Saturation adder 1202 is coupled to gain element 1204. Gain element 1204 is coupled to accumulator 1206. Accumulator 1206 is coupled to saturation adder 1202 via a feedback loop 1208.

Saturation adder 1202 accepts as inputs the 18-bit I or Q component from offset adjustment 602 and an 18-bit output of accumulator 1206 via feedback loop 1208. The output of saturation adder 1202 is the difference between the 18-bit I or Q component from offset adjustment 602 and the 18 most significant bits of the 32-bit output from accumulator 1206.

Gain element 1204 comprises a multiplexer 1210 and a programmable shifter 1212. Gain element 1204 multiplies the output of saturation adder 1202 by a scale factor. The scale factor is selected based on whether fine-grain (digital) cancellation loop 606 is in acquisition mode or track mode. DACC 608 controls the switch between acquisition mode and tracking mode for fine-grain (digital) cancelation loop 606. A signal, DACC_ACQ_TRACK_n controls multiplexer 1210. DACC_ACQ_TRACK_n is an internal signal that is controlled by a finite state machine. The finite state machine is described below with reference to FIG. 14. If fine-grain (digital) cancellation loop 606 is in acquisition mode, DACC_ACQ_TRACK_n signal will select a high gain, shown in FIG. 12 as fine-grain acquire offset scaler (FG_ACQ_OFFSET_SCALER), as the output signal of multiplexer 1210. This causes fine grain (digital) loop 606 to represent a high pass filter in the receive path with a 3 dB filter bandwidth of 100 KHz. If fine-grain (digital) cancellation loop 606 is in track mode, DACC_ACQ_TRACK_n signal will select a low gain, shown in FIG. 12 as fine-grain track offset scaler (FG_TRC_OFFSET_SCALER), as the output signal of multiplexer 1210. This will produce a 3 dB high pass filter bandwidth of 1 KHz. The invention is not limited to the 100 KHz 3 dB bandwidth and the 1 KHz 3 dB bandwidth for acquire and track mode, respectively. One skilled in the relevant art(s) would know that other 3 dB bandwidths could be used without departing from the scope of the present invention. The invention is also not limited to the first order high pass filter structure of fine grain (digital) loop 606. One skilled in the relevant art(s) would know that other high pass filter structures could be used without departing from the scope of the present invention.

Programmable shifter 1212 accepts the output of multiplexer 1210 and shifts the 18-bit I or Q baseband input signal by an amount designated by the selected scaler value from multiplexer 1210. In one embodiment, the output of programmable shifter 1212 provides a 32-bit I or Q baseband output signal.

Accumulator 1206 is used to accumulate an estimate of the DC offset in the baseband signal. Accumulator 1206 comprises a saturating adder 1214 coupled to a register 1218 via a multiplexer 1216. The output of register 1218 connects to saturating adder 1214, thereby providing a feedback loop. Saturating adder 1214 accepts as input the incoming data from the output of programmable shifter 1212 and the data being fed back from the output of register 1218, and provides an output value representing the sum of the incoming I or Q data and the feedback data from register 1218 for accumulating an estimate of the DC offset.

Multiplexer 1216 selects either the output from saturating adder 1214 or an output from the microprocessor interface (shown as wr_data). Multiplexer 1216 is controlled by an FG_ACCUM_LOAD (fine-grain accumulator load) signal. The FG_ACCUM_LOAD signal indicates whether the data from the microprocessor interface (i.e., wr_data) is to be used. Selection of the output from the microprocessor interface allows accumulator 1206 to be loaded with a known value. This enables testing and debugging of fine-grain (digital) cancellation loop 606. Under normal operations, multiplexer 1216 will select the output from saturating adder 1214.

Register 1218 is used to store the output value from saturating adder 1214 or the output value from the microprocessor interface (not shown). A fine grain clock signal, coupled to register 1218, is used to clock register 1218. In an embodiment, fine grain clock signal is a 10 MHz clock signal. Other clock frequencies may be used without departing from the scope of the invention. A fine grain accumulator clear signal, used to clear register 1218 after a DAC update, is handled by DAC controller 608.

The 32-bit output signal from accumulator 1206 is sent to the microprocessor interface for monitoring, testing, and debugging purposes. In one embodiment, the 32-bit output signal from accumulator 1206 is truncated to an 18-bit value and sent via feedback loop 1208 to saturating adder 1202. The feedback loop 1208 carries the DC estimate of register 1218. Subtracting the DC estimate from the baseband signal in saturation adder 1202 removes the DC content from the baseband signal. Fine grain (digital) loop 606 therefore represents a high pass filter in the receive signal path.

DAC Controller

The final mechanism for removing unwanted DC offsets is DAC Controller (DACC) 608. DACC 608 controls a digital-to-analog converter (DAC) 510 within direct converter module 306 via serial bus interface 620. DACC 608 provides updates to DAC 510 in direct converter module 306 based on DC offset values computed from an estimator in DACC 608 or any other DC estimator. DACC 608 updates the DC offset value for DAC 510 based on gain changes, temperature changes, receive frequency, time and drift of the DC offset value.

Figure 13:
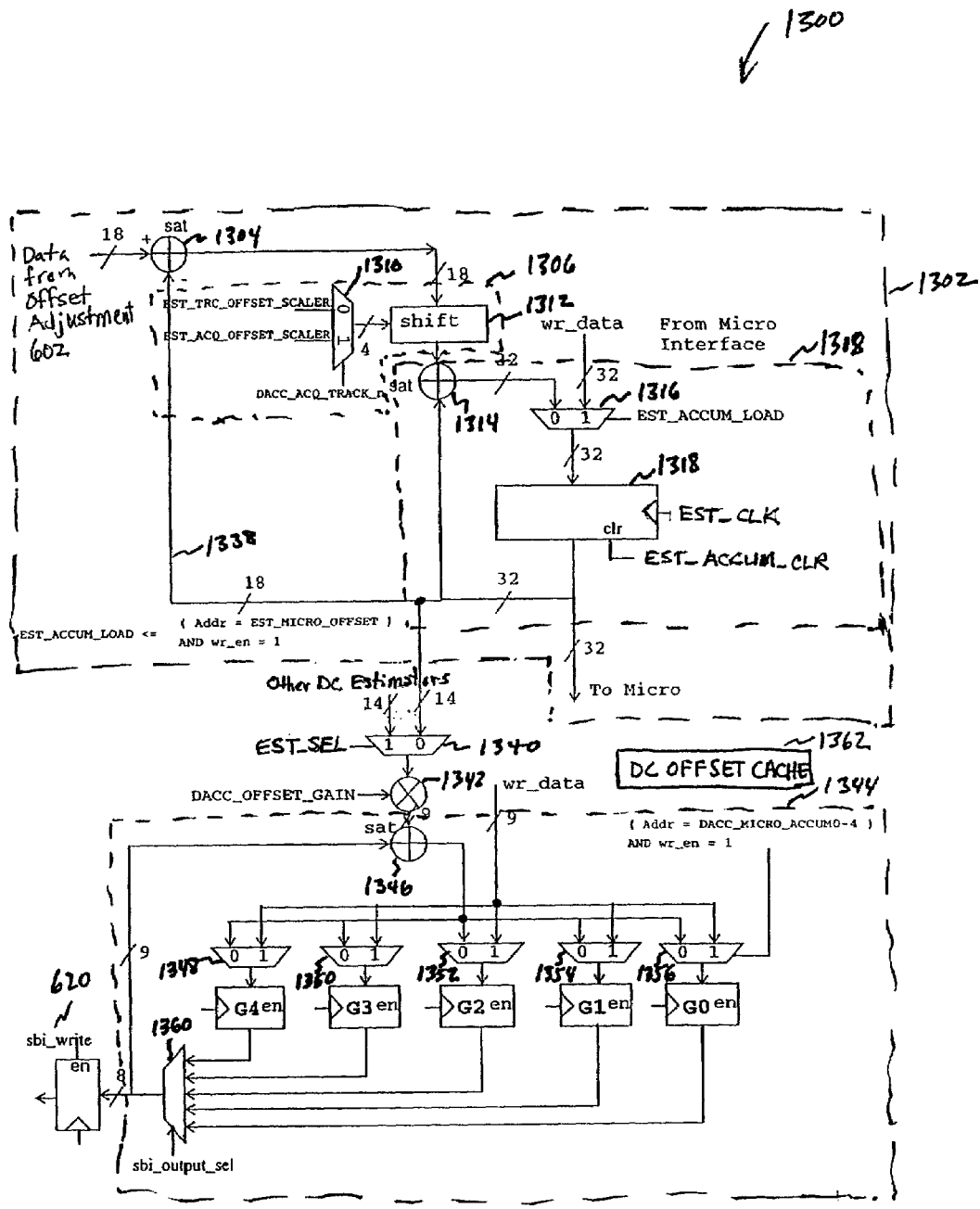
FIG. 13 is a block diagram of a DAC controller (DACC) according to an embodiment of the present invention.

A block diagram 1300 of DACC 608 for either the I or Q component of the baseband signal is shown in FIG. 13. DACC 608 comprises an estimator 1302, a multiplexer 1340, a multiplier 1342, a plurality of accumulators 1344, and SBI write logic 620. Estimator 1302 is coupled to multiplexer 1340. Multiplexer 1340 is coupled to multiplier 1342. Multiplier 1342 is coupled to accumulators 1344, and accumulators 1344 are coupled to SBI write logic 620.

Estimator 1302 is similar to fine-grain (digital) cancellation loop 606. In one embodiment, fine-grain (digital) cancellation loop 606 may be used instead of estimator 1302. Use of fine-grain (digital) cancellation loop 606 in place of estimator 1302 simplifies the design, but provides less flexibility in choosing the acquire and track bandwidth of fine-grain (digital) cancellation loop 606.

Estimator 1302 comprises a saturating adder 1304, a gain element 1306, and an accumulator 1308. Saturation adder 1304 is coupled to gain element 1306. Gain element 1306 is coupled to accumulator 1308. Accumulator 1308 is coupled to saturation adder 1304 via a feedback loop 1338.

Saturation adder 1304 accepts as inputs the 18-bit I or Q component from offset adjustment 602 and the 18 most significant bits of the 32-bit output of accumulator 1308 via feedback loop 1338. The output of saturation adder 1304 is the difference between the I or Q component from offset adjustment 602 and the output from accumulator 1308.

Gain element 1306 comprises a multiplexer 1310 and a programmable shifter 1312. Gain element 1306 multiplies the output of saturation adder 1304 by a scale factor. The scale factor is selected based on whether DACC 608 is in acquisition mode or track mode. A signal, DACC_ACQ_TRACK_n controls multiplexer 1310. DACC_ACQ_TRACK_n is an internal signal that is controlled by a finite state machine. The finite state machine is described below with reference to FIG. 14. If DACC 608 is in acquisition mode, DACC_ACQ_TRACK_n signal will select a high gain, shown in FIG. 13 as estimator acquire offset scaler (EST_ACQ_OFFSET_SCALER), as the output signal of multiplexer 1310. This causes estimator 1302 to represent a high pass filter between the output of offset adjustment 602 and the output of saturation adder 1304 with a 3 dB high pass filter bandwidth of 100 KHz. If DACC 608 is in track mode, DACC_ACQ_TRACK_n signal will select a low gain, shown in FIG. 13 as estimator track offset scaler (EST_TRC_OFFSET_SCALER), as the output signal of multiplexer 1310. This will produce a 3 dB high pass filter bandwidth of 1 KHz. The invention is not limited to the 100 KHz 3 dB bandwidth and the 1 KHz 3 dB bandwidth for acquire and track mode, respectively. One skilled in the relevant art(s) would know that other 3 dB bandwidths could be used without departing from the scope of the present invention.

Programmable shifter 1312 accepts the output of multiplexer 1310 and shifts the 18-bit I or Q baseband input signal by an amount designated by the selected scaler value from multiplexer 1310. In an embodiment, the output of programmable shifter 1312 provides a 32-bit I or Q baseband output signal.

Accumulator 1308 is used to accumulate an estimate of the DC offset in the baseband signal. Accumulator 1308 comprises a saturating adder 1314 coupled to a register 1318 via a multiplexer 1316. The output of register 1318 connects to saturating adder 1314, thereby providing a feedback loop. Saturating adder 1314 accepts as input the incoming data from the output of programmable shifter 1312 and the data being fed back from the output of register 1318, and provides an output value representing the sum of the incoming I or Q data and the feedback data from register 1318 for accumulating an estimate of the DC offset.

Multiplexer 1316 selects either the output from saturating adder 1314 or an output from a microprocessor interface (shown as wr_data). Multiplexer 1316 is controlled by an estimator accumulator load (EST_ACCUM_LOAD) signal. The EST_ACCUM_LOAD signal indicates whether the data from the microprocessor interface (i.e., wr_data) is to be used. Selection of the output from the microprocessor interface allows accumulator 1308 to be loaded with a known value. This enables testing and debugging of DACC 608. Under normal operations, multiplexer 1316 will select the output from saturating adder 1314.

Register 1318 is used to store the output value from saturating adder 1314 or the output value from the microprocessor interface (not shown). An estimator clock signal, connected to register 1318, is used to clock register 1318. In an embodiment, estimator clock signal is a 10 MHz clock signal. Other clock frequencies may be used without departing from the scope of the invention. An estimator accumulator clear signal, for clearing accumulator 1308 after a DAC update, is handled by DAC controller 608.

The 32-bit output signal from accumulator 1308 is sent to the microprocessor interface for viewing. In one embodiment, the 32-bit output signal from accumulator 1308 is truncated to an 18-bit value and sent via feedback loop 1338 to saturating adder 1304. The feedback loop 1338 carries the DC estimate of register 1318. Subtracting the DC estimate from the baseband signal in saturation adder 1304 removes the DC content from the baseband signal. The estimator loop 1302 therefore represents a high pass filter between the output of offset adjustment 602 and the output of saturation adder 1304.

The 32-bit output signal from accumulator 1308 is also truncated to a 14-bit value and sent to multiplexer 1340. This 14-bit value also represents an estimate of the DC offset. Based on an estimator select signal (EST_SEL), multiplexer 1340 then selects the estimated DC offset value from estimator 1302 or any other DC offset estimator. One skilled in the relevant art(s) would know that any DC estimator could be used to feed into multiplexer 1340 without departing from the scope of the present invention.

The output of multiplexer 1340 is fed into multiplier 1342. Multiplier 1342 scales the estimated DC offset value to match the gain of the analog RF front end. A loop gain of unity in the DACC loop gain is necessary in order for the DACC loop to converge within one DAC update. The adjustment of the multiplier value DACC_OFFSET_GAIN allows the DACC loop gain of unity to be maintained while the baseband gain changes.

The output of multiplier 1342 is fed into accumulators 1344. Accumulators 1344 comprise a saturating adder 1346, a plurality of multiplexers (1348, 1350, 1352, 1354, and 1356), a plurality of registers (G0–G4), and a multiplexer 1360. Saturating adder 1346 is coupled to each of multiplexers 1348, 1350, 1352, 1354, and 1356. Multiplexer 1348 is coupled to register G4. Multiplexer 1350 is coupled to register G3. Multiplexer 1352 is coupled to register G2. Multiplexer 1354 is coupled to register G1. Multiplexer 1356 is coupled to register G0. Each of registers G0–G4 are coupled to multiplexer 1360.

Accumulators 1344 comprise DACC accum 0, DACC accum 1, DACC accum 2, DACC accum 3, and DACC accum 4. DACC accum 0 comprises saturation adder 1346, multiplexer 1356, register G0 and multiplexer 1360. DACC accum 1 comprises saturation adder 1346, multiplexer 1354, register G1 and multiplexer 1360. DACC accum 2 comprises saturation adder 1346, multiplexer 1352, register G2 and multiplexer 1360. DACC accum 3 comprises saturation adder 1346, multiplexer 1350, register G3 and multiplexer 1360. DACC accum 4 comprises saturation adder 1346 , multiplexer 1348, register G4 and multiplexer 1360.

Saturation adder 1346 accepts as input the estimated DC offset value from multiplier 1342 and one of the outputs from registers G0–G4. The output of saturation adder 1346 is the sum of the estimated DC offset value from multiplier 1342 and one of the outputs from registers G0–G4, depending on the current gain setting of the receiver system.

Multiplexers 1348, 1350, 1352, 1354, and 1356 are used in a similar manner as multiplexer 1316, and that is, to enable the microprocessor (not shown) to overwrite or load values into registers G0–G4 for initialization, testing, and debugging purposes. Multiplexers 1348, 1350, 1352, 1354, and 1356 select either the output from saturating adder 1346 or the output from the microprocessor interface (shown as wr_data).

Registers G0–G4 are representative of each LNA 304 or mixer 308 gain setting. Each register stores an estimation of how much DC offset there is based on that particular gain setting. The values from registers G0–G4 are used to update the DC offset value for DAC 510 in direct converter module 306 based on gain changes, temperature changes, time and drift values. In other words, depending upon which gain setting the RF receiver is presently in, the corresponding register value (G0, G1, G2, G3, or G4) will be used to update the DC offset value for DAC 510 in direct converter module 306.

Multiplexer 1360 is used to select the appropriate register to update DAC 510 in direct converter module 306, based on an sbi_output_sel signal. An 8-bit value from the selected register (G0, G1, G2, G3, or G4) is transmitted over serial bus interface (SBI) 620 to DAC 510 via multiplexer 1360.

A 9-bit output of multiplexer 1360 is also fed back to saturating adder 1346 to enable the accumulation of the DC offset estimate for the appropriate gain setting.

Registers G0–G4 provide a pretty good estimate of how much DC offset is found in the baseband signal for each gain setting. But periodically, that estimate may need to be updated. At such times, the current estimates stored in registers (G0–G4) are updated with new estimator values from estimator 1302, which are added to the output of the appropriate accumulator (DACC accum 0–DACC accum 4) from accumulators 1344.

As previously shown with respect to FIG. 3B, gain changes may produce an instantaneous change in the DC offset at baseband. DACC 608, therefore stores a DC offset estimate for each of the five gain settings in LNA 304 and mixer 308. In an embodiment where fewer than five gain settings are being used, fewer registers (G0–G4) may be used. Fewer registers (G0–G4) may also be used in embodiments where DC offsets do not vary significantly across gain settings.

When a gain change occurs, DACC 608 will switch multiplexer 1360 to select a new output from one of registers (G0–G4), and write the new value to DAC 510 in direct converter module 306 over SBI 620. DACC 608 may wait for a specified amount of time defined by DACC_CLR_TIME and then clear the fine-grain loop and estimation accumulators 1206 and 1308, respectively. During this waiting period, DACC 608 is switched to acquisition mode to quickly remove any residual DC offset by means of fine grain (digital) loop 606. After the expiration of the DACC_CLR_TIME, fine grain (digital) loop 606 and estimator 1302 are kept in acquisition mode for a specific amount of time defined by DACC_ACQ_TIME to obtain a better first order estimate of the DC offset for this new gain setting. After the expiration of the DACC_ACQ_TIME, DACC 608 will switch back to tracking mode and fine tune the newly computed DC offset.

DC offset components of the baseband signal may often drift due to fading and temperature changes, despite a constant gain setting. Drift from fading and temperature changes may cause large DC offsets at baseband that degrade performance in the analog RF front end of the receiver. In particular, such offsets can limit the head room in analog-to-digital converter 502 and cause signal saturation. DC offset can further degrade the linearity of baseband filter 312. To avoid these problems, DACC 608 may update DAC 510 on direct converter 306 over SBI 620 based on the DC offset from fine grain accumulator 1218. When the absolute value of this DC offset reaches a threshold value, DAC 510 on direct converter 306 is updated in almost the same way as during a gain change. The difference in a gain change update is that the current DACC accumulator (selected by the current gain setting) is first updated with the estimator value from the accumulator through multiplexer 1340, multiplier 1342, and saturation adder 1346. Updating the DACC accumulator before updating DAC 510 in direct converter 306 is essential for the drift update to reduce DC offset in the receive chain. Drift update preserves a minimum amount of headroom in analog-to-digital converter 502, prevents signal saturation and nonlinear behavior of baseband filter 312 causing distortion of the baseband signal. Drift updates are further described with reference to FIG. 16B.

Instead of continuously monitoring the DC offset in fine-grain (digital) cancellation loop 606, DAC 510 on direct converter 306 can be updated periodically. To allow for maximum dynamic range of analog-to-digital converter 502 and to get a more accurate value of the DC offset, DACC 608 will update DAC 510 on direct converter 306 periodically based on a DACC 608 track timer (DACC_TRC_TIME). This is referred to as a periodic update. When the timer is enabled, it will count down in increments of 16 clock cycles from the time tracking mode was entered. When it times-out, an update to DAC 510 on direct converter 306 is triggered the same way as during a drift update. The DACC accumulator defined by the current gain setting is used to update DAC 510 in direct converter 306. Periodic updates are further described with reference to FIGS. 14 and 16B.

DC offset components depend on temperature. Thus, the DC offset estimate at one temperature may be quite different from the DC offset at another temperature despite being computed using the same gain setting. DACC 608 compensates for temperature changes using a DC offset cache (shown in FIG. 17A).

Figure 17A:
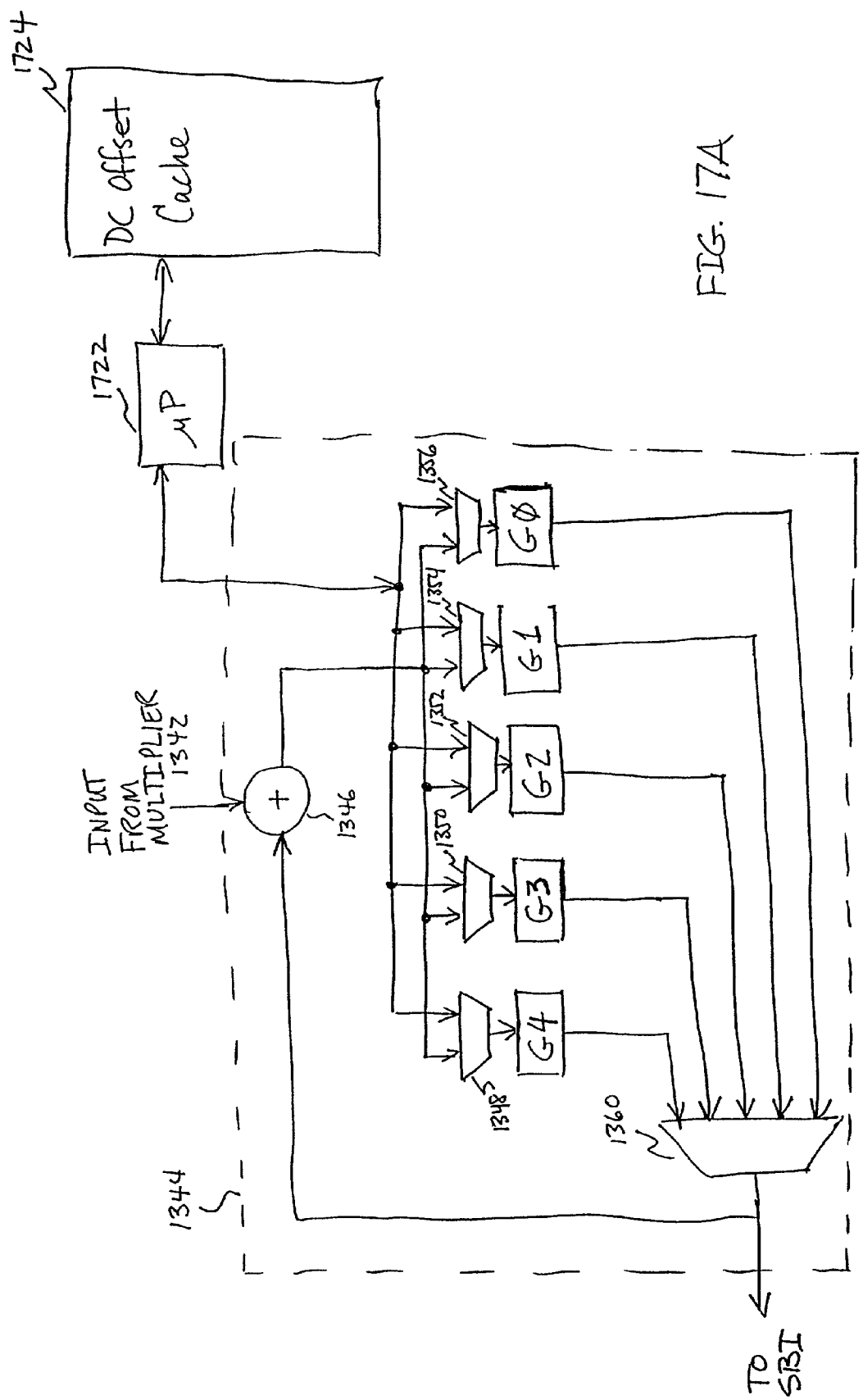
FIG. 17A is a block diagram illustrating a process for updating registers G0–G4 based on temperature changes.

FIG. 17A is a block diagram illustrating a process for updating registers G0–G4 based on temperature changes. FIG. 17A shows a microprocessor 1722, DC offset cache 1724, and accumulators 1344 (which include registers G0–G4). DC offset cache 1724 may contain DC offset estimates for each gain setting according to temperature. The size of DC offset cache 1724 may be 5 (gain settings)×64 (temperature steps)×9 (bits). Alternatively, the size of DC offset cache 1724 may be larger or smaller, depending upon the number of gain settings provided by the RF front end, the number of desired temperature steps, and the number of bits used to represent the DC offset estimate. When MSM 504 is powered ON, microprocessor 1722 loads five values into DACC 608 registers G0–G4 from DC offset cache 1724 based on the current temperature. Using these values, DACC 608 acquires and tracks DC offsets across gain settings as described above until the temperature changes significantly. When microprocessor 1722 senses the change in temperature, microprocessor 1722 reads the values presently in the five accumulators 1344 and stores them in DC offset cache 1724 at the old temperature step. Microprocessor 1722 then loads accumulators 1344 (i.e., registers G0–G4) with new values out of DC offset cache 1724 for the new temperature.

However, the DC offset estimate computed by DACC 608 for the current gain setting is more accurate than the one stored in DC offset cache 1724 at the new temperature, and therefore, takes precedence over the stored value. Storing accumulators 1344 at the old temperature step before loading accumulators 1344 with the DC offset values at the current temperature enables DC offset cache 1724 to be continuously updated with more precise values.

In one embodiment, the initial DC offset values loaded into DC offset cache 1724 are based on statistical data. In another embodiment, the initial DC offset values are set to zero (0). In this embodiment, DACC 608 expands the table over time. For example, if DACC 608 wants to replace estimates in registers G0–G4 and finds that DC offset cache 1724 is empty, DACC 608 will keep current values and update DC offset cache 1724. The algorithm is "self-learning".

Figure 17B:
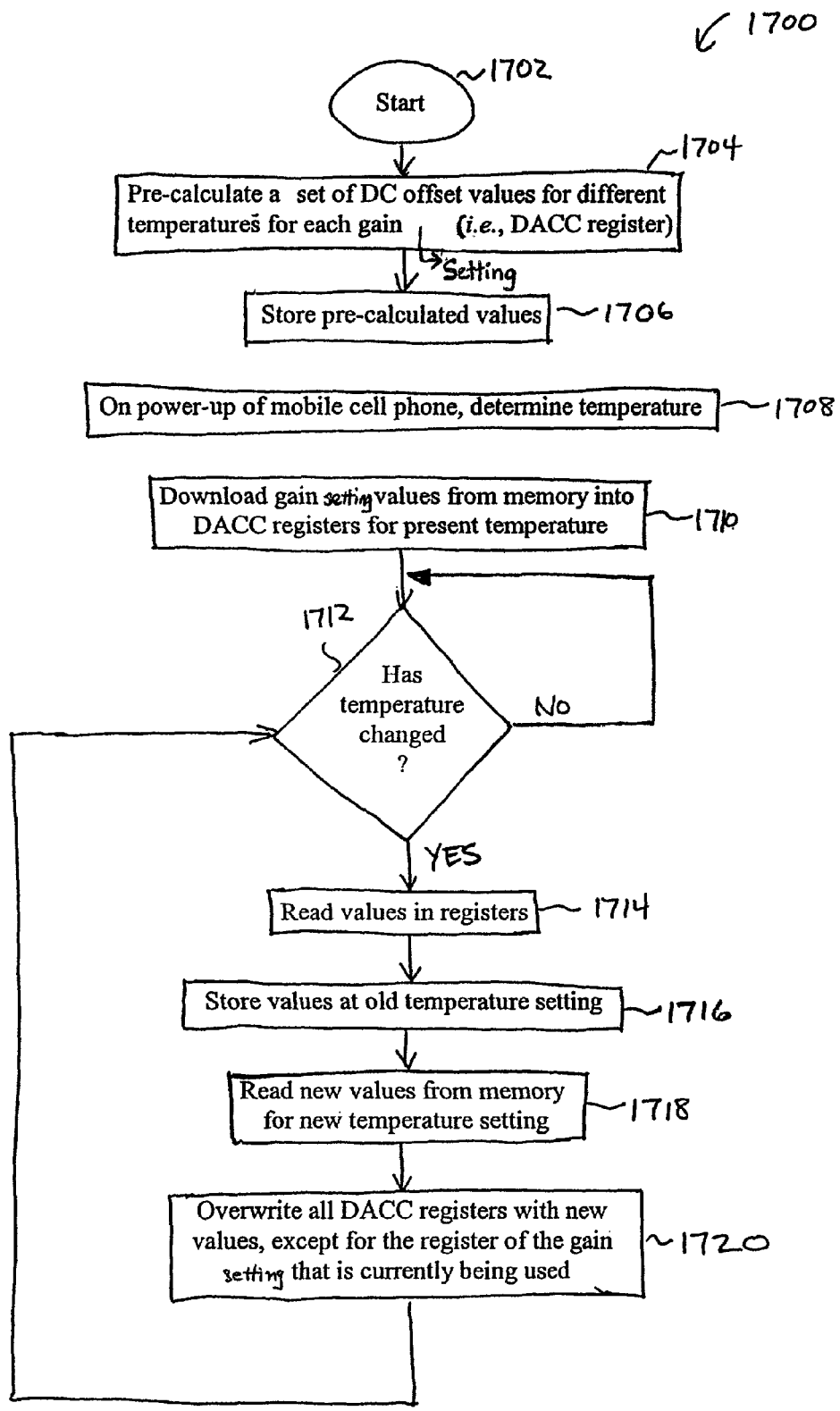
FIG. 17B is a flow diagram illustrating a method for updating registers G0–G4 based on temperature changes.

FIG. 17B is a flow diagram illustrating a method for updating registers G0–G4 based on temperature changes. The process begins with step 1702, and immediately proceeds to step 1704.

In step 1704, a set of DC offset values is determined for various temperatures within a temperature range for each gain setting (i.e., DACC register). The temperature steps with the temperature range are large enough so that an actual change in DC offset occurs.

In step 1706, the temperature values are stored in memory. In one embodiment, the temperature values determined in step 1704 are stored in DC offset cache 1724. The process then proceeds to step 1708.

In step 1708, on power-up of a mobile cell phone, microprocessor 1722 will determine the current temperature using a temperature sensor. The process then proceeds to step 1710.

In step 1710, the DC offset values for all gain settings of the current temperature are downloaded from memory into DACC registers G0–G4. The process proceeds to decision step 1712.

In decision step 1712, it is determined whether the temperature has changed significantly. To accomplish this, microprocessor 1722 reads the temperature sensor and compares it to the temperature setting of the current values in registers G0–G4. If the temperature has not changed, the process remains in decision step 1712 until a temperature change occurs. If it is determined that a temperature change has occurred, then the process proceeds to step 1714.

In step 1714, microprocessor 1722 reads the current values in registers G0–G4. In step 1716, microprocessor 1722 stores these values at the old temperature setting in memory. This enables the temperature settings to be constantly updated with more precise values. The process then proceeds to step 1718.

In step 1718, microprocessor 1722 reads the DC offset values at the new temperature setting for registers G0–G4. The process then proceeds to step 1720.

In step 1720, microprocessor 1722 overwrites DACC registers G0–G4 with the DC offset values at the new temperature setting with the exception of the register of the gain setting currently being used. The register of the gain setting currently being used has been accumulating during the time the temperature was changing. Therefore, the value in that register is most likely more correct than the value read from memory in step 1718. The process then proceeds back to decision step 1712 to determine whether another temperature change has occurred.

Figure 14:
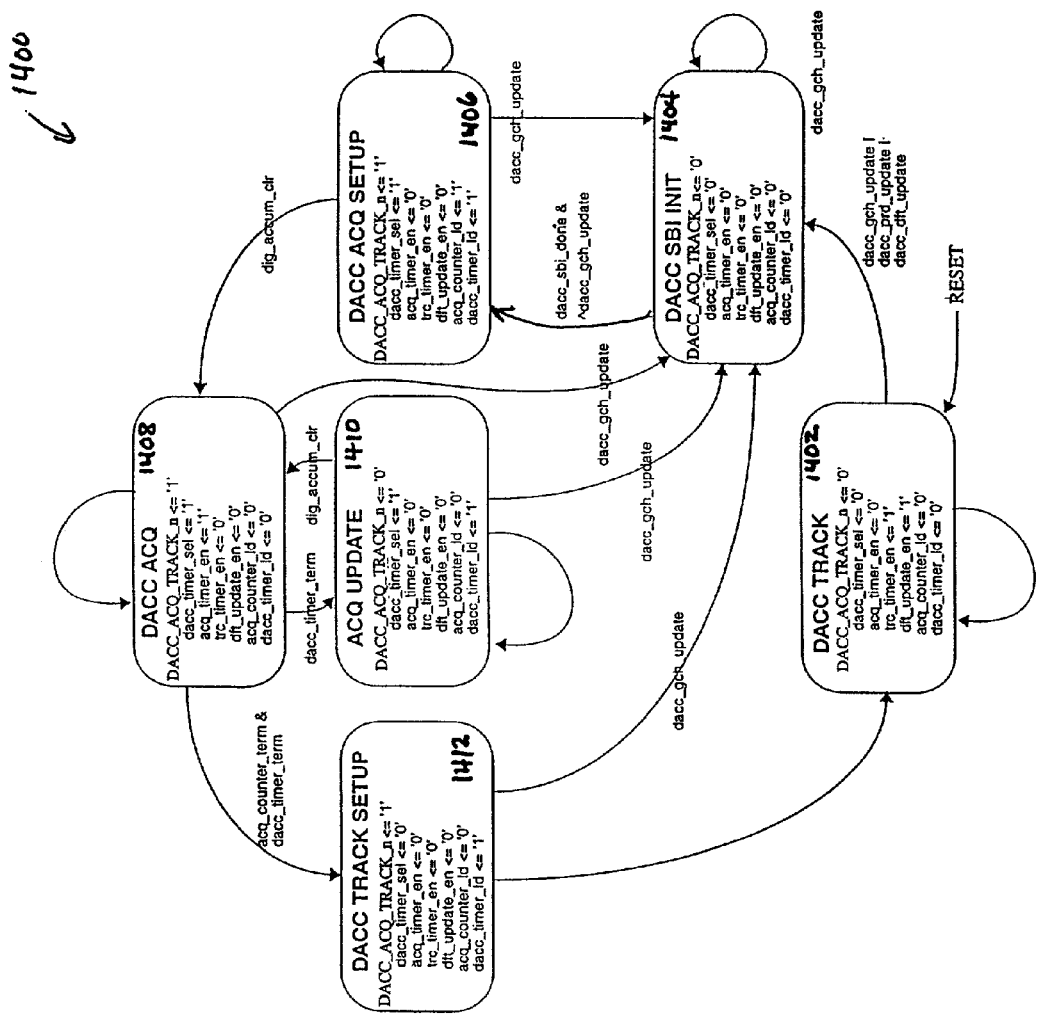
FIG. 14 is a DACC state machine according to an embodiment of the present invention.

FIG. 14 is a finite state diagram 1400 for DACC 608. DACC finite state diagram 1400 comprises a DACC TRACK state 1402, a DACC SBI INIT state 1404, a DACC ACQ SETUP state 1406, a DACC ACQ state 1408, an ACQ UPDATE state 1410, and a DACC TRACK SETUP state 1412.

On a reset, DACC 608 begins in DACC TRACK state 1402. In DACC TRACK state 1402, the output signals that are set include track timer enable (trc_timer_en) and drift update enable (dft_update_en). The trc_timer_en enables a tracking timer to begin and the dft_update_en enables a drift update to occur. DACC 608 will remain in track mode until a gain change occurs, a periodic update is asserted, or a drift update is asserted. If either a gain change, a periodic update, or a drift update occurs, DACC 608 will jump from DACC TRACK state 1402 to DACC SBI INIT state 1404.

In DACC SBI INIT state 1404, DACC 608 has performed an update, and the new DC offset estimate must be written across SBI 620 on to DAC 510 in direct converter module 306. In DACC SBI INIT state 1404, SBI 620 is set up and a write request is executed. DACC 608 will remain in DACC SBI INIT state 1404 until a dacc_sbi_done signal is asserted. DACC 608 jumps from DACC SBI INIT state 1404 to DACC ACQ SETUP state 1406 when a dacc_sbi_done signal is asserted and no DACC gain change update (dacc_gch_update) has occurred.

In the DACC ACQ SETUP state 1406, DAC 510 has been updated in the receive path of the RF front end and estimator 1302 is set to acquire mode. Output signals that are set from state 1406 include DACC_ACQ_TRACK_n, a DACC timer select signal (dacc_timer_sel), an acquisition counter load signal (acq_counter_ld), and a DACC timer load signal (dacc_timer_ld). DACC 608 will remain in state 1406 until the results of the DAC update have propagated to the output of BBF 605. This is determined by a digital accumulator clear time-out, which will be described with reference to FIG. 16A. Once the digital accumulator clear time-out occurs, DACC 608 may jump to DACC ACQ state 1408. If a DACC gain change update occurs prior to the receipt of the digital accumulator clear time-out, DACC 608 will return to DACC SBI INIT state 1404.

In DACC ACQ state 1408, estimator 1302 and fine grain (digital) loop 606 are in acquire mode and acquire the DC offset. Output signals that are set from state 1408 include DACC_ACQ_TRACK_n, dacc_timer_sel, and an acquisition timer enable signal (acq_timer_en). DACC 608 will remain in state 1408 until a DACC gain change update occurs, a DACC timer terminates or the DACC timer terminates and an acquire counter terminates. The DACC timer time-out indicates that fine grain (digital) loop 606 and estimator 1302 have settled on the new DC offset value. The DACC timer terminate circuitry is described below with reference to FIG. 16B. The acquire counter terminate circuitry is described below with reference to FIG. 16C. If a DACC gain change occurs, DACC 608 will return to DACC SBI INIT state 1404. If a DACC timer terminate and an acquisition counter terminate occur, DACC 608 will jump to DACC TRACK SETUP state 1412. If a DACC timer terminate occurs, DACC 608 will jump to ACQ UPDATE state 1410.

When DACC 608 jumps to ACQ UPDATE state 1410, more than one acquisition update exists. In ACQ UPDATE state 1410, the following output signals are set: dacc_timer_sel and dacc_timer_ld. DAC 510 has been updated in the receive path of the RF front end and fine grain (digital) loop 606 and estimator 1302 are set back to tracking mode through DACC_ACQ_TRACK_n. DACC 608 will remain in state 1410 until a DACC gain change update occurs or a digital accumulator clear signal occurs. The digital accumulator clear signal indicates that the update of the DAC in the RF front end has propagated to the output of BBF 605, and is described in further detail below with reference to FIG. 16A. On a digital accumulator clear signal, DACC 608 will jump back to DACC ACQ step 1408. On a DACC gain change update, DACC 608 will jump back to DACC SBI INIT state 1404.

In DACC TRACK SETUP state 1412, DACC 608 prepares for DACC TRACK state 1402 by setting up and loading DACC timer 1614 with the DACC_TRC_TIME value. Output signals that are set from DACC TRACK SETUP include DACC_ACQ_TRACK_n, and dacc_timer_ld. If a DACC gain change update occurs while DACC 608 is in DACC TRACK SETUP state 1412, then DACC 608 will return to DACC SBI INIT state 1404. Otherwise, after setup, DACC 608 will immediately go to DACC TRACK state 1402.

Returning to FIG. 6, DC cancellation block 600 interfaces to the automatic gain control (AGC) after fine-grain (digital) cancellation loop 606 at 630. The AGC provides DC cancellation block 600 with information indicating when changes in the gain setting occur. DC cancellation block 600 alerts the AGC when in acquire mode to indicate that large parts of the signal spectrum might be removed by the high pass characteristic of fine grain (digital) loop 606 and that large DC offsets might be present in the baseband signal.

The AGC provides three signals to DC cancellation block 600. The AGC indicates when a gain change has occurred in mixer 308 and LNA 304. At that time, mix_change and lna_change are set. The AGC also provides a mixer_lna_range[2:0]. This signal is used primarily by DACC 608, and indicates the current gain setting used by the AGC. The actual LNA 304 and RF mixer 308 may use a different encoding for the gain setting than indicated by mixer_lna_range. This signal is used to select the proper DAC offset value from accumulators 1344.

DC cancellation block 600 provides a 1-bit signal to the AGC indicating when large DC offsets may be corrupting the baseband signal. This signal, agc_dc_gain_sel, is the logical OR of the coarse-grain signal PDM_ACQ_TRACK_n and dacc_timer_sel. When set, one or more of mechanisms 602, 604, 606, and 608 are in acquire mode to remove the DC offsets. During this time, the bandwidth of one or more mechanisms 602, 604, 606, and 608 are increased to quickly acquire a DC offset estimate and large parts of the signal spectrum might be removed. The AGC will use this signal to disable or slow down accumulation of the power level during acquisition mode, and thus prevent corruption of an AGC gain estimate by tracking the DC offsets or the reduced signal power instead of the actual signal power.

Figure 15:
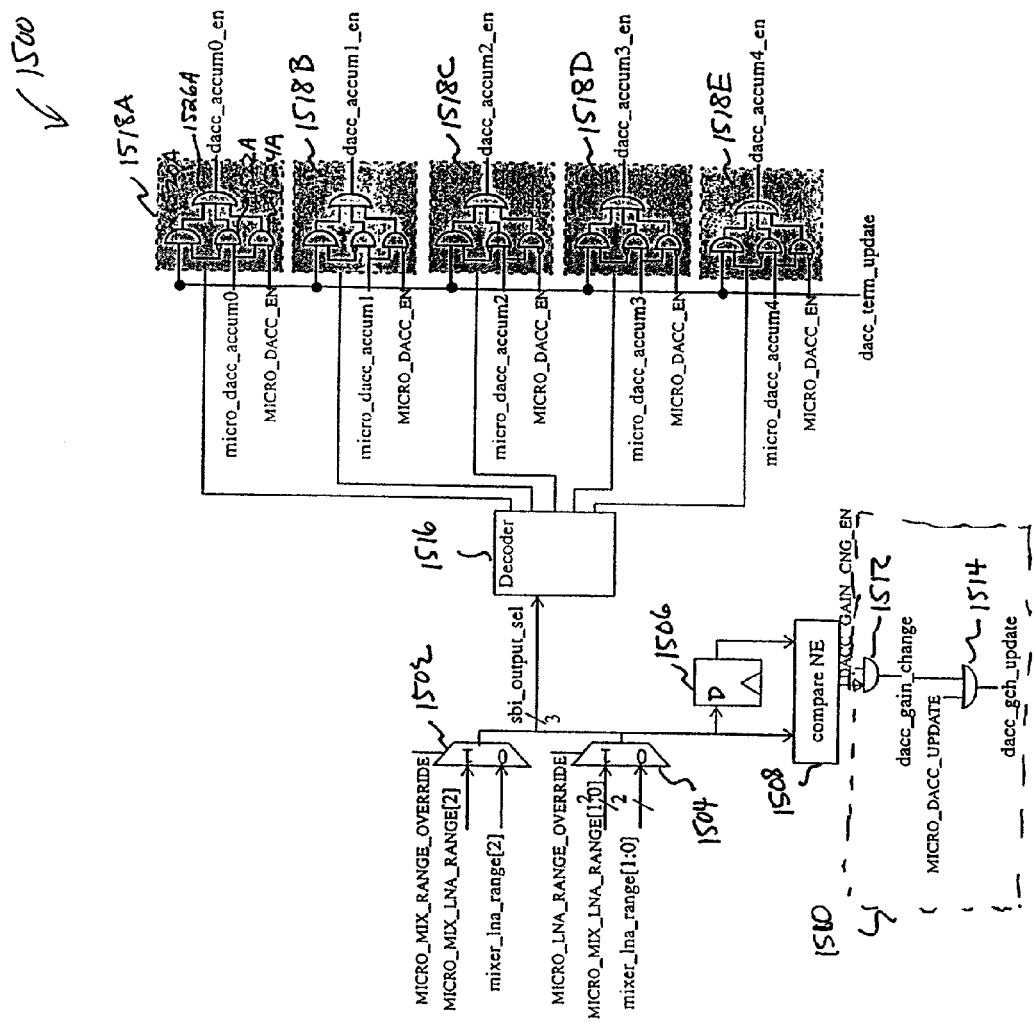
FIG. 15 is a diagram of a DAC controller (DACC) enable hardware circuit for enabling a DACC accumulator according to an embodiment of the present invention.

FIG. 15 is a diagram illustrating a DACC enable hardware circuit 1500 for enabling the DACC accumulators (DACC_accum_0, DACC_accum_1, DACC_accum_2, DACC_accum_3, and DACC_accum_4). Circuit 1500 comprises two multiplexers 1502 and 1504, a D-flip flop 1506, a comparator 1508, logic circuitry 1510, a decoder 1516, and logic circuitry 1518A–1518E.

Multiplexer 1502 is controlled by a MICRO_MIX_RANGE_OVERRIDE signal. The inputs to multiplexer 1502 include bit 2 from the AGC mixer_lna_range[2:0] (described above) and bit 2 of the microprocessor signal MICRO_MIX_LNA_RANGE[2:0]. MICRO_MIX_RANGE_OVERRIDE, when set, indicates that the microprocessor value should override the AGC signal. In other words, the input from the microprocessor is selected to be output from multiplexer 1502. This might be used to ignore mixer gain changes. In other words, if MICRO_MIX_RANGE_OVERRIDE is set and MICRO_MIX_LNA_RANGE[2] remains unchanged, a mixer gain change will no longer cause state machine 1400 to go to state DACC SBI INIT 1404.

Multiplexer 1504 is controlled by a MICRO_LNA_RANGE_OVERRIDE signal. The inputs to multiplexer 1504 include bits 0 and 1 from the AGC mixer_lna_range[2:0] (described above) and bits 0 and 1 of the microprocessor signal MICRO_MIX_LNA_RANGE[2:0]. MICRO_LNA_RANGE_OVERRIDE, when set, indicates that the microprocessor value should override the AGC signal. In other words, the input from the microprocessor is selected to be output from multiplexer 1504. As previously stated, mixer_lna_range[2:0] is a three-bit value that comes from the AGC and indicates the current gain setting. MICRO_LNA_RANGE_OVERRIDE might be used to ignore LNA gain changes. In other words, if MICRO_LNA_RANGE_OVERRIDE is set and MICRO_MIX_LNA_RANGE[1:0] remains unchanged, a LNA gain change will no longer cause state machine 1400 to go to state DACC SBI INIT 1404. Ignoring LNA gain changes might be used in the case where LNA gain changes cause minimal DC offset changes at baseband and can therefore be ignored by DACC 608. Any minor change in DC offset can be removed using fine grain (digital) loop 606.

Two multiplexers 1502 and 1504 are used in order that they may be overridden separately. Bit 2 may be overridden, but not bits 0 and 1 or vice versa.

The output of multiplexers 1502 and 1504 is a three-bit encoding (sbi_output_sel) that indicates which gain setting DACC 608 is going to use. The three bit encoding, sbi_output_sel, is sent to decoder 1516. Using a three-bit input, decoder 1516 decodes five outputs out of a possible eight outputs. Each of the five outputs from decoder 1516 is sent to five logic circuits 1518A–1518E, respectively.

Logic circuits 1518A–1518E are identical. With reference to logic circuit 1518A, logic circuit 1518A comprises three logical AND gates 1520A, 1522A, and 1524A, and an OR gate 1526A. Thus, there are three conditions under which an accumulator will be enabled. The first condition, identified at logical AND gate 1520A, is a normal operating condition. The first condition identifies the decoder output as selecting the correct DACC accumulator. A DACC term update must also occur for the first condition. The second condition identifies the decoder output as selecting the incorrect DACC accumulator, but the microprocessor would like to update this DACC accumulator anyway. The second condition may be used to update the temperature cache. The third condition identifies the DACC accumulator as being enabled, but the microprocessor may want to update the DACC accumulator anyway. This third condition may be used for testing and debugging purposes.

The sbi output_sel_output from multiplexers 1502 and 1504 is also sent to D flip flop 1506 where the signal is delayed by one clock cycle. The output of D flip flop 1506 is then sent to comparator 1508.

Comparator 1508 accepts as input signals sbi_output_sel from multiplexers 1502 and 1504 and a delayed version of sbi_output_sel from D flip flop 1506. Comparator 1508 determines if the gain setting changed between the two inputs. If the two inputs are different, then the comparator outputs a "1" indicating that a gain change has occurred. Otherwise comparator 1508 will output a "0" indicating that a gain change has not occurred.

The output of comparator 1508 is input to logic circuit 1510. Logic circuit 1510 comprises a logical AND gate 1512 and a logical OR gate 1514. Logical AND gate 1512 is used to enable/disable a DACC gain change. DACC_GAIN_CHG_EN is a signal sent by the microprocessor to enable or disable a DACC gain change. OR gate 1514 is used to enable the microprocessor to trigger a gain change update even if a gain change did not occur. This may be used for testing and debugging purposes.

FIG. 16A is a diagram illustrating a timing circuit 1600 for determining the length of time to wait before clearing an accumulator after a new DC offset estimate has been updated. The time reflects the propagation delay for the signal from the input of LPF 312 to reach the output of BBF 605. Timing circuit 1600 comprises a set-reset flip flop 1602 coupled to a counter 1604. After a new DC offset estimate has been written across SBI 620 to DAC 510 in direct converter 306, DACC 608 will receive a signal called dacc_sbi_done, indicating that the transfer is complete. The dacc_sbi_done signal sets flip flop 1602, and one clock cycle later, enables counter 1604. The dacc_sbi_done signal also enables counter 1604 to be loaded with an initial count time (DACC_CLR_TIME). Counter 1604 is a down counter. Down counter 1604, starting from DACC_CLR_TIME, will count down to zero or time-out. Upon timing out, counter 1604 will output a signal, dig_accum_clr, indicating that the accumulator can be cleared. Signal dig_accum_clr is then used to reset or disable flip flop 1602.

FIG. 16B is a diagram illustrating a counter circuit 1610 for DAC controller 608. Circuit 1610 is used for performing periodic updates and acquisition updates. The timer value for periodic updates defines the length of time to wait before triggering a new update of DAC 510 by starting an update cycle in state machine 1400. The acquisition time describes the length of time to wait before fine grain (digital) loop 606 and estimator 1302 have settled on a new DC offset value. Circuit 1610 comprises a multiplexer 1612, a counter 1614, three logical three-input AND gates 1616, 1618, and 1622, a comparator 1620, a three input logical OR gate 1624 and a two input logical AND gate 1628.

Counter 1614 handles both periodic updates and acquisition updates. dacc_timer_ld signal is controlled by finite state machine 1400. Multiplexer 1612 is used to select the time required to do an acquisition update (signal DACC_ACQ_TIME) or a periodic update (signal DACC_TRC_TIME). The output of multiplexer 1612 is loaded into counter 1614 as the counter load value, based on dacc_timer_ld. Counter 1614 is enabled when DACC 608 is enabled, a DACC periodic update is enabled and the track timer is enabled, or the acquisition timer is enabled. When counter 1614 is enabled, counter 1614 will count down from the counter value to zero. When counter 1614 has timed-out, dacc_timer_term will be asserted.

Logical AND gate 1616 indicates the requirements for a DACC periodic update. For a DACC periodic update, a periodic update must be enabled (DACC_PRD_UPD_EN), DACC 608 must be in track mode (DACC_ACQ_TRACK_n), as indicated by an inverter 1615 at the input of logical AND gate 1616, and the DACC timer must have timed-out (dacc_timer_term).

Logical AND gate 1618 indicates the requirements for a DACC acquisition update. For a DACC acquisition update, DACC 608 must be in acquisition mode (DACC_ACQ_TRACK_n), the DACC timer must have timed-out (dacc_timer_term), and the acquire counter must not have terminated (acq_counter_term), as indicated by inverter 1617 at the input of logical AND gate 1618.

Comparator 1620 and AND gate 1622 are used to determine when a DACC drift update will occur. Drift updates are based on the DC offset of fine grain accumulator 1218. The absolute value of fine grain accumulator 1218 (fg_accum_abs_val) is compared with a programmable threshold value (fg_thresh) set by the microprocessor. If the absolute value of fine grain accumulator 1218 is greater than the programmed threshold value, then a greater than threshold output is asserted. At AND gate 1622, if the greater than threshold output is asserted from comparator 1620, and drift updates (dft_update_en) as well as DACC drift updates (DACC_DFT_UPDATE_EN) are enabled, then a DACC drift update will be performed. The DACC drift update signal is delayed by two clock cyles (box 1626).

Logical OR gate 1624 accepts the periodic update output (dacc_prd_update) from AND gate 1616, the acquisition update (dacc_acq_update) from AND gate 1618, and the delayed DACC drift update (dacc_dft_update) from delay 1626 and outputs whichever one is set. If DACC 608 is enabled, one of the updates will be asserted as a DACC term update (dacc_term_update).

FIG. 16C is a diagram illustrating a DAC controller acquisition counter circuit 1630. Counter circuit 1630 comprises a logical AND gate 1632 and a counter 1634. The value of DACC_ACQ_COUNT defines the number of DAC updates that occur during an acquisition cycle controlled by state machine 1400. An acq_counter_ld signal will enable an initial count value (DACC_ACQ_COUNT) to be loaded into counter circuit 1630. acq_counter_ld is an output signal generated by finite state machine 1400. Counter circuit 1630 is enabled if DACC 608 is enabled, DACC 608 is in acquisition mode, and a DACC timer term has occurred (see AND gate 1632). When counter circuit 1630 is enabled, counter 1634 will count down, starting from DACC_ACQ_COUNT, to zero. Upon reaching zero, acq_counter_term will be asserted, sending DACC 608 back to state DACC TRACK 1402.

FIG. 16D is a diagram illustrating a circuit 1640 for requesting an SBI write for a DAC controller. Circuit 1640 is comprised of a D flip flop 1642 and a logical OR gate 1644. According to circuit 1640, an SBI write request will occur one cycle after a dacc_term_update or a dacc_gch_update (see OR gate 1644).

Environment

The various aspects and embodiments of DC offset cancellation described herein may be implemented in various wireless communication systems, such as CDMA systems, W-CDMA systems, GPS systems, AMPS systems, etc. DC offset cancellation may also be used for a forward link or a reverse link in these communication systems.

The various aspects and embodiments of DC offset cancellation described herein may be implemented by various means. For example, all or some portions of DC offset cancellation may be implemented in hardware, software, or a combination thereof. For a hardware implementation, DC offset cancellation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the elements used for DC offset cancellation may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the relevant art(s).

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but is to be accorded the widest scope consistent with the principles and novel features disclosed herein and in accordance with the following claims and their equivalents.

What is claimed is:

1. A DC offset cancellation block in an RF receiver having a direct converter for direct down conversion of a received RF signal to a baseband signal, said DC offset cancellation block comprising:
   offset adjustment means for removing static DC components from said baseband signal;
   a coarse-grain loop for removing large portions of said static DC components and time-varying DC components from said baseband signal;
   a fine-grain loop for removing said static and said time varying DC components from said baseband signal; and
   a digital-to-analog converter controller (DACC) for removing large portions of said static DC components and slowly time-varying DC components by means of updating a digital-to-analog converter in said direct converter with a DC offset based on gain setting, receive frequency changes, and temperature changes of a low noise amplifier (LNA), a mixer, a baseband filter and an analog-to-digital converter (ADC) from a front end of said RF receiver;
   wherein said offset adjustment means, said coarse-grain loop, said fine-grain loop, and said DACC interact with one another to remove unwanted DC offsets in said RF receiver.

2. The DC offset cancellation block of claim 1, wherein said offset adjustment means comprises a register and an adder, wherein said register stores an estimate of the static DC offset component and wherein said offset adjustment means subtracts the static DC offset component from said baseband signal.

3. The DC offset cancellation block of claim 1, wherein said coarse-grain loop comprises a gain element for enabling one of a high gain adjustment and a low gain adjustment, said high gun adjustment for expanding the bandwidth of a high pass filter to acquire the DC offset component, said low gain adjustment for narrowing the bandwidth of said high pass filter to track the DC offset component; and an accumulator for accumulating the DC offset component.

4. The DC offset cancellation block of claim 3, wherein the 3 dB frequency of said high pass filter is increased when a gain change occurs in the front end of said RF receiver.

5. The DC offset cancellation block of claim 3, wherein the 3 dB frequency of said high pass filter is decreased when the DC offset component is locked in during tracking of the DC offset component.

6. The DC offset cancellation block of claim 3, wherein said coarse-grain loop further comprises a pulse density modulator (PDM) and an RC network which together form a digital-to-analog convener, for converting a digitized version of the DC offset component to an analog signal, wherein said analog signal is sent to said direct converter or said ADC to remove the DC offset component from said baseband signal.

7. The DC offset cancellation block of claim 1, wherein said fine-gain loop comprises a gain element for enabling one of a high gain adjustment and a low gain adjustment, said high gain adjustment for expanding the bandwidth of a high pass filter to acquire the DC offset component, said low gain adjustment for narrowing the bandwidth of said high pass filter to track the DC offset component; an accumulator for accumulating the DC offset component; and an adder for subtracting the accumulated DC offset component from said baseband signal.

8. The DC offset cancellation block of claim 7, wherein said fine-gain loop operates in a digital domain.

9. The DC offset cancellation block of claim 1, wherein said DACC comprises an estimator for determining an estimate of the DC offset, a multiplier for scaling the DC offset obtained from said animator, and a plurality of accumulators, wherein each of said plurality of accumulators determines a DC offset value based on said gain setting and temperature changes of said low noise amplifier (LNA) and said mixer from said front end of said RF receiver, wherein said plurality of accumulators accept as input one of the DC offset from said estimator and the DC offset from another DC estimator.

10. The DC offset cancellation block of claim 9, wherein the DC offset determined from said estimator is used to update said DAC in said direct converter when the DC offset is greater than a threshold value.

11. The DC offset cancellation block of claim 9, wherein said DACC further comprises a timer, wherein said DACC periodically updates said DAC in said direct converter with the DC offset generated by one of said plurality of accumulators when said timer times-out.

12. The DC offset cancellation block of claim 9, wherein said one of said plurality of accumulators is determined by the gain setting of said LNA and said mixer of said front end of said receiver.

13. The DC offset cancellation block of claim 9, wherein said estimator comprises a gain element for enabling one of a high gain adjustment and a low gain adjustment, said high gain adjustment for expanding the bandwidth of a high pass filter to acquire the DC offset component said low gain adjustment for narrowing the bandwidth of said high pass filter to track the DC offset component; an accumulator for accumulating the DC offset component; and an adder for subtracting the accumulated DC offset component from said baseband signal.

14. A method for cancelling DC offset in an RF receiver having a direct converter for direct down conversion of a received RF signal to a baseband signal, said method comprising the steps of:
   (1) applying a high gain to expand the bandwidth of a high pass filter when a gain change occurs in said RF receiver;
   (2) rapidly acquiring the DC offset within said baseband signal prior to the timing out of a timer;

(3) applying a low gain to narrow the bandwidth of said high pass filter when the timer has timed-out; and (4) tracking the DC offset to fine tune the acquired DC offset, wherein the DC offset is removed from the baseband signal.

15. The method of claim 14, wherein a static DC offset is removed from said baseband signal prior to performing step (1) to prevent saturation of said RF receiver.

16. The method of claim 14, further comprising the steps of:

(5) storing in accumulators a DC offset estimate for each gain swing in the RF receiver based on the acquired DC offset from step (4); and (6) updating a digital-to-analog converter in said direct converter using one of the DC offset estimates stored in accumulators, said one of the DC offset estimates being determined by said gain setting in use by said RF receiver.

17. The method of claim 14, further comprising the steps of:

(5) adding a estimated DC offset from step (4) to current DC offset estimates stored in accumulators for each gain setting;

(6) storing the resultant estimated DC offsets from step (5) in said accumulators for each gain setting; and (7) updating a digital-to-analog converter in said direct converter using one of said DC offset estimates stored in said accumulators, said one of said DC offset estimates being determined by said gain setting in use by said RF receiver.

18. The method of claim 17, wherein steps (5)–(7) are performed whenever the DC offset of a fine grain loop exceeds a programmable threshold value.

19. The method of claim 17, wherein steps (5)–(7) are performed periodically based on a timer timing-out.

20. The method of claim 17, further comprising the steps of:

(8) updating said accumulators with correct DC offset value; and (9) updating a digital-to-analog converter in said direct converter when a temperature change has occurred.

21. The method of claim 20, wherein step (8) comprises the steps of:

(a) reading the DC offsets from said accumulators;

(b) staring the DC offsets in an old temperature setting;

(c) reading new DC offset values from memory fur the new temperature setting; and (d) overwriting said accumulators with the new DC offset values with the exception of the DC offset of said one of said accumulators associated with the current gain setting of said RF receiver and using said one of said accumulators to update said digital-to-analog converter in said direct converter.

22. A DC offset cancellation block; comprising:

offset adjustment means for removing static DC components from a baseband signal;

a coarse-grain loop for removing large portions of said static DC components and time-varying DC components from said baseband signal;

a fine-grain loop fur removing said static and time-varying DC components from said baseband signal; and a digital-to-analog converter controller (DACC) for removing large portions of said static DC components and slowly time-varying DC components by means of updating a digital-to-analog converter with a DC offset based on gain setting changes, frequency changes, and temperature changes of an amplifier and a mixer from a front end of a receiver.

23. The DC offset cancellation block of claim 22, wherein said offset adjustment means, said coarse-grain loop, said fine-grain loop, and said DACC interact with one another to remove unwanted DC offset in said receiver.

* * * * *